United States Patent
Zhu et al.

(10) Patent No.: US 11,558,787 B2
(45) Date of Patent: Jan. 17, 2023

(54) MONITORING EVENT MANAGEMENT METHOD AND APPARATUS

(71) Applicant: Huawei Technologies Co., Ltd., Shenzhen (CN)

(72) Inventors: Fangyuan Zhu, Beijing (CN); Yan Li, Beijing (CN); Yang Xin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 204 days.

(21) Appl. No.: 17/131,110

(22) Filed: Dec. 22, 2020

(65) Prior Publication Data

US 2021/0112462 A1  Apr. 15, 2021

Related U.S. Application Data

(63) Continuation of application No. PCT/CN2019/092558, filed on Jun. 24, 2019.

(30) Foreign Application Priority Data

Jun. 26, 2018 (CN) .......................... 201810671797.6

(51) Int. Cl.
*H04W 36/00* (2009.01)
*H04W 36/14* (2009.01)

(52) U.S. Cl.
CPC ... *H04W 36/0022* (2013.01); *H04W 36/0066* (2013.01); *H04W 36/14* (2013.01)

(58) Field of Classification Search
CPC ............... H04W 8/08; H04W 36/0011; H04W 36/0033; H04W 36/0022; H04W 36/0016;
(Continued)

(56) References Cited

U.S. PATENT DOCUMENTS

| | | |
|---|---|---|
| 2011/0171975 A1 | 7/2011 | Yin |
| 2011/0200010 A1 | 8/2011 | Hu et al. |

(Continued)

FOREIGN PATENT DOCUMENTS

| | | |
|---|---|---|
| CN | 101483855 A | 7/2009 |
| CN | 101494882 A | 7/2009 |

(Continued)

OTHER PUBLICATIONS

Peng, N., et al., "Mobility Management in Heterogeneous Networks", Dec. 10, 2009, 3 pages. With English Abstract.
(Continued)

*Primary Examiner* — Allahyar Kasraian
(74) *Attorney, Agent, or Firm* — Conley Rose, P.C.

(57) ABSTRACT

A method implemented by a network exposure function network element includes: sending first information of a monitoring event to a first mobility management network element; receiving identification information of a second mobility management network element from a data management network element, where the first mobility management network element supports interworking between a first network and a second network without an interface, and the first mobility management network element and the second mobility management network element respectively serve a user equipment in the first network and the second network; and sending second information of the monitoring event to the second mobility management network element based on the identification information of the second mobility management network element.

20 Claims, 14 Drawing Sheets

(58) Field of Classification Search
CPC .. H04W 36/12; H04W 36/14; H04W 36/0066; H04W 36/36

See application file for complete search history.

(56) References Cited

U.S. PATENT DOCUMENTS

| | | | |
|---|---|---|---|
| 2013/0015953 | A1 | 1/2013 | Hsu et al. |
| 2014/0092808 | A1 | 4/2014 | Jain et al. |
| 2015/0079992 | A1 | 3/2015 | Kaura |
| 2015/0111533 | A1 | 4/2015 | Chandramouli et al. |
| 2018/0027414 | A1 | 1/2018 | Li et al. |
| 2018/0123884 | A1 | 5/2018 | Kim et al. |
| 2018/0167854 | A1 | 6/2018 | Enomoto et al. |
| 2019/0124561 | A1* | 4/2019 | Faccin ............... H04W 8/02 |
| 2020/0053582 | A1* | 2/2020 | Zhu ............... H04W 36/0033 |
| 2020/0396587 | A1* | 12/2020 | Kim ............... H04W 8/04 |
| 2021/0258842 | A1* | 8/2021 | Fiorese ............... H04W 36/36 |

FOREIGN PATENT DOCUMENTS

| | | |
|---|---|---|
| CN | 101686455 A | 3/2010 |
| CN | 101730024 A | 6/2010 |
| CN | 102036220 A | 4/2011 |
| CN | 103339967 A | 10/2013 |
| CN | 106792936 A | 5/2017 |
| CN | 107005843 A | 8/2017 |
| CN | 107087255 A | 8/2017 |
| CN | 107770756 A | 3/2018 |
| CN | 107889175 A | 4/2018 |
| CN | 104823469 B | 1/2019 |
| EP | 2755423 B1 | 3/2017 |
| WO | 2017102748 A1 | 6/2017 |
| WO | 2018008922 A2 | 1/2018 |
| WO | 2018065060 A1 | 4/2018 |
| WO | 2018085187 A1 | 5/2018 |
| WO | 2018085784 A1 | 5/2018 |
| WO | 2020216125 A1 | 10/2020 |

OTHER PUBLICATIONS

Yongchun, T., et al., "The Research of Mobility Management in Wireless Communication Network," Dec. 15, 2003, 4 pages.

"Agenda for SA2#126," SA WG2 Meeting #126, Feb. 26-Mar. 2, 2018, Montreal, Canada, S2-181417, 13 pages.

Alawe, I., et al., "RNN-based traffic prediction for pro-active scaling of the AMF," eurecom.fr, 2018, 1 page.

3GPP TS 23.501 V15.2.0 (Jun. 2018) "3rd Generation Partnership Project; Technical Specification Group Services and System Aspects; System Architecture for the 5G System; Stage 2 (Release 15)," 216 pages.

3GPP TS 23.502 V15.2.0 (Jun. 2018) "3rd Generation Partnership Project; Technical Specification Group Services and System Aspects; Procedures for the 5G System; Stage 2 (Release 15)," 308 pages.

3GPP TS 23.503 V15.2.0 (Jun. 2018) "3rd Generation Partnership Project; Technical Specification Group Services and System Aspects; Policy and Charging Control Framework for the 5G System; Stage 2 (Release 15)," 67 pages.

3GPP TS 23.682 V15.5.0 (Jun. 2018) "3rd Generation Partnership Project; Technical Specification Group Services and System Aspects; Architecture enhancements to facilitate communications with packet data networks and applications (Release 15)," 125 pages.

3GPP TR 23.724 V0.4.0 (Jun. 2018) "3rd Generation Partnership Project; Technical Specification Group Services and System Aspects; Study on Cellular IoT support and evolution for the 5G System (Release 16)," 179 pages.

NTT Docomo, et al., "O1#20: No. N26 Interworking Procedures," SA WG2 Meeting #122bis, Aug. 21-25, 2017, Sofia-Antipolis, France, S2-178126, 17 pages.

Huawei, et al., "Solution for KI#9 common north-bound APIs for EPC-5GC interworking," SA WG2 Meeting #127, Apr. 16-20, 2018, Sanya, China, S2-183982, 7 pages.

Huawei, et al., "Update solution #37 for KI 11: Monitoring," SAWG2 Meeting #128, Jul. 2-6, 2018, Vilnius, Republic of Lithuania, S2-187218, 3 pages.

* cited by examiner

MONITORING EVENT MANAGEMENT METHOD AND APPARATUS

CROSS-REFERENCE TO RELATED APPLICATIONS

This application is a continuation of International Patent Application No. PCT/CN2019/092558, filed on Jun. 24, 2019, which claims priority to Chinese Patent Application No. 201810671797.6, filed on Jun. 26, 2018. The disclosures of the aforementioned applications are hereby incorporated by reference in their entireties.

TECHNICAL FIELD

The present disclosure relates to the field of communications technologies, and in particular, to a monitoring event management method and apparatus.

BACKGROUND

With development of an Internet of Things (IoT) service, terminal devices supporting the IoT service may be found everywhere in various industries. There is a high probability that a terminal device supporting the IoT service deploys power saving features such as a power saving mode (PSM) and extended discontinuous reception (eDRX). That is, the IoT terminal device is in a sleep state most of the time. The terminal device does not interact with a network, and if an application side blindly interacts with the terminal device, an exception occurs. Therefore, an application layer needs to learn of a status of the terminal device before interacting with the terminal device. An IoT capability exposure function provides a mechanism and a specific subscription event used to learn of a current status of the terminal device (for example, whether the terminal device is reachable, or a location change).

In an evolved packet system (EPS) network, a third-party application server (AS) or a service capability server (SCS) obtains information such as a status and a location of the IoT terminal device from the network using a service capability exposure function (SCEF) network element, or deliver some parameters (for example, an active timer parameter and a tracking area update (TAU) timer parameter) to the terminal device using the SCEF network element, to affect behavior of the terminal device. After receiving a capability subscription request of the SCEF network element, a home subscriber server (HSS) sends the capability subscription request to a mobility management entity (MME) network element, and the MME network element returns a subscribed-to report to the SCEF network element. In this way, the AS may provide a service for the IoT terminal device based on the status of the terminal device.

In a 5th generation (5G) network, a network exposure function (NEF) network element is a network element supporting functionality of external exposure of a network function. Functionality of the NEF network element include a monitoring function. The monitoring function is used to monitor a specific event of the terminal device in a 5G system, and enable, using the NEF network element, information about the monitoring event to be exposed externally. In this way, the network can obtain the monitoring event (for example, an event such as a location, reachability, a roaming status, or a loss of connectivity of the terminal device) of the terminal device using the NEF network element.

Currently, after the terminal device moves from the 5G network to the EPS network, or moves from the EPS network to the 5G network, continuous monitoring on the monitoring event before the movement cannot be ensured. Consequently, the AS cannot serve the terminal device based on the status of the terminal device.

SUMMARY

Embodiments of the present disclosure provide a monitoring event management method and apparatus.

According to one aspect, an embodiment of this application provides a monitoring event management method. The method includes the following.

A network exposure function network element (for example, an SCEF+NEF network element) sends first information of a monitoring event to a first mobility management network element (for example, an access and mobility management function (AMF) network element or an MME network element). The first mobility management network element supports interworking between a first network and a second network without an interface (for example, an N26 interface). The network exposure function network element receives identification information of a second mobility management network element (for example, an MME network element or an AMF network element) from a data management network element (for example, a unified data management (UDM)+HSS network element), where the first mobility management network element serves a user equipment (UE) in the first network (where, for example, when the first mobility management network element is an AMF network element, the first network is a 5G network; or when the first mobility management network element is an MME network element, the first network is an EPS network), and the second mobility management network element serves the user equipment in the second network (where, for example, when the second mobility management network element is an MME network element, the second network is an EPS network; or when the second mobility management network element is an AMF network element, the second network is a 5G network). The network exposure function network element sends second information of the monitoring event to the second mobility management network element based on the identification information of the second mobility management network element.

In this application, that there is no interface between the first network and the second network means that there is no interface between the first mobility management network element of the first network and the second mobility management network element of the second network.

According to the foregoing method, when the second mobility management network element does not support interworking with the first mobility management network element through an interface, in the first network, the network exposure function network element may subscribe to the monitoring event by sending the first information of the monitoring event to the first mobility management network element. After the user equipment moves from the first network to the second network, the network exposure function network element sends the second information of the monitoring event to the second mobility management network element based on the obtained identification information of the second mobility management network element, to subscribe to a same monitoring event in the second network, thereby ensuring that monitoring, in the network, on the monitoring event before the movement is not interrupted.

In a possible design, that the network exposure function network element receives identification information of a second mobility management network element from a data management network element includes: The network exposure function network element sends query information to the data management network element after receiving first indication information from the first mobility management network element, where the query information is used by the network exposure function network element to obtain the identification information of the second mobility management network element from the data management network element. In this way, the network exposure function network element can obtain the identification information of the second mobility management network element from the data management network element, to send the second information of the monitoring event to the second mobility management network element.

In a possible design, the first indication information is used to indicate that the user equipment moves from the first network to the second network. In this way, the network exposure function network element can learn that the user equipment moves from the first network to the second network.

In a possible design, that the network exposure function network element receives identification information of a second mobility management network element from a data management network element includes: The network exposure function network element subscribes from the data management network element to: sending, by the data management network element, the identification information of the second mobility management network element to the network exposure function network element when the user equipment moves from the first network to the second network. In this way, when the user equipment moves from the first network to the second network, the network exposure function network element can receive the identification information of the second mobility management network element from the data management network element, to send the second information of the monitoring event to the second mobility management network element.

In a possible design, before that the network exposure function network element subscribes from the data management network element, the method further includes: The network exposure function network element receives second indication information from the first mobility management network element, where the second indication information is used to indicate that the first mobility management network element does not support interworking with the second mobility management network element through an interface. In this way, the network exposure function network element can learn that the first mobility management network element does not support interworking with the second mobility management network element through an interface, to trigger to subscribe to the identification information of the second mobility management network element from the data management network element.

According to another aspect, this application further discloses a monitoring event management method. The method includes the following.

A first mobility management network element subscribes from a data management network element to: notifying, by the data management network element, the first mobility management network element when user equipment moves from a first network to a second network, where the first mobility management network element serves the user equipment in the first network. The first mobility management network element receives a notification from the data management network element, to learn that the user equipment moves from the first network to the second network. The first mobility management network element sends indication information to a network exposure function network element, where the indication information is used to trigger the network exposure function network element to query the data management network element for identification information of a second mobility management network element. The second mobility management network element serves the user equipment in the second network, and the first mobility management network element does not support interworking with the second mobility management network element through an interface (in other words, supports interworking between the first network and the second network without an interface).

According to the foregoing method, when the second mobility management network element does not support interworking with the first mobility management network element through an interface, in the first network, the network exposure function network element may subscribe to a monitoring event by sending first information of the monitoring event to the first mobility management network element. The first mobility management network element subscribes from the data management network element to an event that the user equipment moves from the first network to the second network. When the first mobility management network element learns, from the data management network element, that the user equipment moves from the first network to the second network, the first mobility management network element triggers the network exposure function network element to obtain the identification information of the second mobility management network element from the data management network element. Then, the network exposure function network element sends second information of the monitoring event to the second mobility management network element. In this way, the network exposure function network element subscribes, in the second network, to a monitoring event that is the same as that in the first network, thereby ensuring that monitoring, in the network, on the monitoring event before the movement is not interrupted.

In a possible design, the indication information is further used to indicate that the user equipment moves from the first network to the second network. In this way, the network exposure function network element can learn that the user equipment moves from the first network to the second network.

According to another aspect, this application further discloses a monitoring event management method. The method includes the following.

A first mobility management network element determines that the first mobility management network element does not support interworking with a second mobility management network element through an interface, where the first mobility management network element serves user equipment in a first network, and the second mobility management network element serves the user equipment in a second network; and the first mobility management network element sends indication information to a network exposure function network element, where the indication information is used to indicate that the first mobility management network element does not support interworking with the second mobility management network element through an interface (in other words, supports interworking between the first network and the second network without an interface).

According to the foregoing method, when the second mobility management network element does not support interworking with the first mobility management network element through an interface, when the network exposure function network element sends first information of a monitoring event to the first mobility management network element, the first mobility management network element notifies the network exposure function network element that the first mobility management network element does not support interworking with the second mobility management network element through an interface, and triggers the network exposure function network element to subscribe to and obtain identification information of the second mobility management network element from the data management network element. When the user equipment moves from the first network to the second network, the data management network element sends the identification information of the second mobility management network element to the network exposure function network element, and then the network exposure function network element sends second information of the monitoring event to the second mobility management network element. In this way, the network exposure function network element subscribes, in the second network, to a monitoring event that is the same as that in the first network, thereby ensuring that monitoring, in the network, on the monitoring event before the movement is not interrupted.

According to another aspect, this application further discloses a monitoring event management method. The method includes the following.

A first mobility management network element determines that the first mobility management network element supports interworking between a first network and a second network without an interface (for example, an N26 interface). The first mobility management network element subscribes from a data management network element to: sending, by the data management network element, identification information of a second mobility management network element to a network exposure function network element when user equipment moves from the first network to the second network, where the first mobility management network element serves the user equipment in the first network, and the second mobility management network element serves the user equipment in the second network.

According to the foregoing method, when the second mobility management network element does not support interworking with the first mobility management network element through an interface, when the network exposure function network element sends first information of a monitoring event to the first mobility management network element, the first mobility management network element determines that the first mobility management network element supports interworking between the first network and the second network without an interface (for example, an N26 interface), and subscribes from the data management network element, such that the network exposure function network element obtains the identification information of the second mobility management network element. When the user equipment moves from the first network to the second network, the data management network element sends the identification information of the second mobility management network element to the network exposure function network element, and then the network exposure function network element sends second information of the monitoring event to the second mobility management network element. In this way, the network exposure function network element subscribes, in the second network, to a monitoring event that is the same as that in the first network, thereby ensuring that monitoring, in the network, on the monitoring event before the movement is not interrupted.

In a possible design, that the first mobility management network element subscribes from the data management network element includes: The first mobility management network element sends a type of the second mobility management network element and identification information of the network exposure function network element to the data management network element. In this way, the first mobility management network element may subscribe from the data management network element, such that the network exposure function network element obtains the identification information of the second mobility management network element. When the user equipment moves from the first network to the second network, the data management network element sends the identification information of the second mobility management network element to the network exposure function network element identified by the identification information of the network exposure function network element.

In a possible design, the method further includes: The first mobility management network element determines, based on subscription data of the user equipment, that the user equipment has a capability of interworking between the first network and the second network.

According to another aspect, this application further discloses a monitoring event management method. The method includes the following.

A first mobility management network element determines that the first mobility management network element does not support interworking with a second mobility management network element through an interface (in other words, supports interworking between a first network and a second network without an interface); the first mobility management network element maps first information of a monitoring event in the first network to second information of the monitoring event in the second network, where the first mobility management network element serves user equipment in the first network, and the second mobility management network element serves the user equipment in the second network; and the first mobility management network element sends the second information of the monitoring event to a data management network element.

According to the foregoing method, when the second mobility management network element does not support interworking with the first mobility management network element through an interface, when a network exposure function network element sends the first information of the monitoring event to the first mobility management network element, the first mobility management network element determines that the first mobility management network element does not support interworking with the second mobility management network element through an interface; and then, the first mobility management network element maps the first information of the monitoring event in the first network to the second information of the monitoring event in the second network, and sends the second information of the monitoring event to the data management network element. When the user equipment moves from the first network to the second network, the data management network element sends the second information of the monitoring event to the second mobility management network element. In this way, the network exposure function network element subscribes, in the second network, to a monitoring event that is the same as that in the first network, thereby ensuring that monitoring, in the network, on the monitoring event before the movement is not interrupted.

According to another aspect, an embodiment of this application provides a monitoring event management apparatus, where the apparatus has a function of implementing behavior of the network exposure function network element in the foregoing method. The function may be implemented by hardware, or implemented by hardware executing corresponding software. The hardware or the software includes one or more modules corresponding to the foregoing function. In a possible design, a structure of the apparatus includes a processor and a transceiver. The processor is configured to support the apparatus in performing the corresponding function in the foregoing method. The transceiver is configured to implement communication between the apparatus and a first mobility management network element/a data management network element/a second mobility management network element. The apparatus may further include a memory. The memory is configured to couple to the processor, and stores a program instruction and data that are necessary for the apparatus.

According to another aspect, an embodiment of this application provides a monitoring event management apparatus, where the apparatus has a function of implementing behavior of the first mobility management network element in the foregoing method. The function may be implemented by hardware, or implemented by hardware executing corresponding software. The hardware or the software includes one or more modules corresponding to the foregoing function. In a possible design, a structure of the apparatus includes a processor and a transceiver. The processor is configured to support the apparatus in performing the corresponding function in the foregoing method. The transceiver is configured to implement communication between the apparatus and a network exposure function network element/a data management network element. The apparatus may further include a memory. The memory is configured to couple to the processor, and stores a program instruction and data that are necessary for the apparatus.

According to another aspect, an embodiment of this application provides a monitoring event management apparatus, where the apparatus has a function of implementing behavior of the first mobility management network element in the foregoing method. The function may be implemented by hardware, or implemented by hardware executing corresponding software. The hardware or the software includes one or more modules corresponding to the foregoing function. In a possible design, a structure of the apparatus includes a processor and a transceiver. The processor is configured to support the apparatus in performing the corresponding function in the foregoing method. The transceiver is configured to implement communication between the apparatus and a network exposure function network element. The apparatus may further include a memory. The memory is configured to couple to the processor, and stores a program instruction and data that are necessary for the apparatus.

According to another aspect, an embodiment of this application provides a monitoring event management apparatus, where the apparatus has a function of implementing behavior of the first mobility management network element in the foregoing method. The function may be implemented by hardware, or implemented by hardware executing corresponding software. The hardware or the software includes one or more modules corresponding to the foregoing function. In a possible design, a structure of the apparatus includes a processor and a transceiver. The processor is configured to support the apparatus in performing the corresponding function in the foregoing method. The transceiver is configured to implement communication between the apparatus and a data management network element. The apparatus may further include a memory. The memory is configured to couple to the processor, and stores a program instruction and data that are necessary for the apparatus.

According to another aspect, an embodiment of this application provides a computer-readable storage medium. The computer-readable storage medium stores an instruction, and when the instruction is run on a computer, the computer is enabled to perform the methods in the foregoing aspects.

According to another aspect, an embodiment of this application provides a computer program product including an instruction. When the computer program product is run on a computer, the computer performs the methods in the foregoing aspects.

According to another aspect, this application provides a chip system. The chip system includes a processor, configured to support the foregoing apparatus or user equipment in implementing a function in the foregoing aspects, for example, generating or processing information in the foregoing methods. In a possible design, the chip system further includes a memory, where the memory is configured to store a program instruction and data that are necessary for a monitoring event management apparatus. The chip system may include a chip, or may include a chip and another discrete device.

BRIEF DESCRIPTION OF DRAWINGS

To describe the technical solutions in the embodiments of the present disclosure more clearly, the following describes the accompanying drawings that need to be used in the embodiments of the present disclosure or the background.

DESCRIPTION OF EMBODIMENTS

The following clearly describes the technical solutions in the embodiments of this application with reference to the accompanying drawings in the embodiments of this application. "A plurality of" in this application refers to two or more than two.

Figure 1:
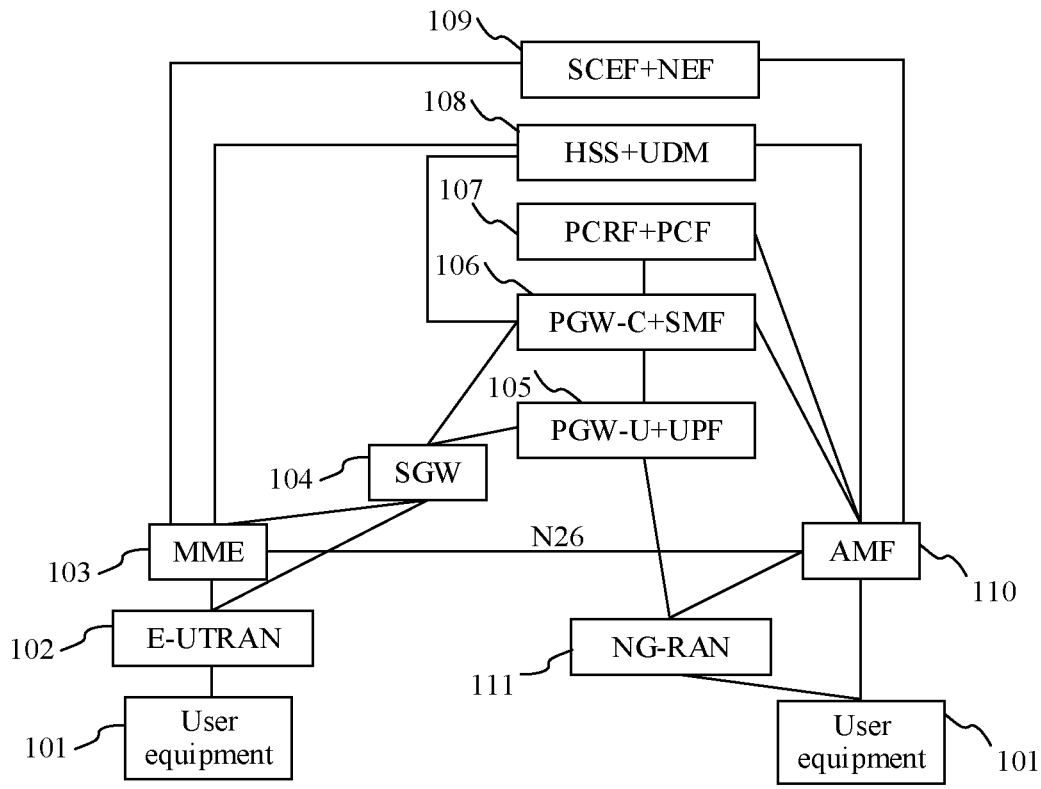
FIG. 1 is a schematic diagram of interworking between a 5G communications system and an EPS communications system according to an embodiment of this application.

FIG. 1 is a schematic diagram of interworking between a 5G communications system and an EPS communications system according to an embodiment of this application.

In a 5G mobile network architecture, a control plane function and a forwarding plane function of a mobile gateway are decoupled, and the separated control plane function of the mobile gateway and a conventional control network element such as an MME of the 3rd Generation Partnership Project (3GPP) are combined to form a unified control plane. A user plane function (UPF) network element can implement user plane functions (an SGW-U and a PGW-U) of a serving gateway (SGW) and a packet data network (PDN) gateway (PGW). Further, a unified control plane network element may be decomposed into an AMF network element and a session management function (SMF) network element. As shown in FIG. 1, a 5G network includes: a next generation (NG)-radio access network (NG-RAN) device 111, an AMF network element 110, a NEF network element 109, a unified data management (UDM) network element 108, a policy control function (PCF) network element 107, an SMF network element 106, and a UPF network element 105.

As shown in FIG. 1, an EPS network includes: an evolved universal terrestrial radio access network (E-UTRAN) device 102, an MME network element 103, an SGW 104, a user plane PGW (PGW-U) 105, a control plane PGW (PGW-C) 106, a policy and charging rules function (PCRF) network element 107, a home subscriber server (HSS) 108, and an SCEF network element 109.

Some network elements in the EPS network and some network elements in the 5G network may be deployed on a same physical entity, such that the EPS network and the 5G network can interact with each other. For example, as shown in FIG. 1, the SCEF network element and the NEF network element may be deployed on a same physical entity. The HSS network element and the UDM network element may be deployed on a same physical entity. The PCRF network element and the PCF network element may be deployed on a same physical entity. The PGW-C network element and the SMF network element may be deployed on a same physical entity. The PGW-U network element and the UPF network element may be deployed on a same physical entity. Alternatively, the foregoing network elements may be separate network elements. This is not limited in this embodiment of this application.

As shown in FIG. 1, a user equipment 101 in this system is not limited to the 5G network, and includes: a mobile phone, an internet of things device, a smart household device, an industrial control device, a vehicle device, or the like. The user equipment may also be referred to as a terminal device, a mobile station, a mobile device, a remote station, a remote terminal, an access terminal, a user equipment (UE), or a user agent. This is not limited herein. The user equipment may alternatively be an automobile in vehicle-to-vehicle (V2V) communication, a machine in machine type communication (MTC), or the like.

The E-UTRAN device 102 and the NG-RAN device 111 are each an apparatus configured to provide a wireless communication function for the user equipment 101, and may include various forms of base stations, for example, a macro base station, a micro base station (also referred to as a small cell), a relay station, and an access point. A device with a base station function may have different names in systems that use different radio access technologies. For example, in a Long Term Evolution (LTE) system, the E-UTRAN device 102 may be referred to as an evolved NodeB (eNB or eNodeB); and in a 3rd generation (3G) system, the E-UTRAN device 102 is referred to as a NodeB. In a new generation system, the NG-RAN device 111 may be referred to as a gNB (gNodeB).

The MME network element 103 in the system may be responsible for authentication, mobility management, and session management of the user equipment 101 in the EPS network. The MME network element may also be referred to as an MME device or an MME entity.

The SMF network element 106 in the system may be responsible for session management of a terminal device in the 5G network. For example, the session management includes selection of a user plane device, reselection of a user plane device, Internet Protocol (IP) address assignment, quality of service (QoS) control, and session establishment, modification, or release.

The AMF network element 110 in the system may be responsible for registration, mobility management, a tracking area update procedure, and the like of the terminal device in the 5G network. The AMF network element may also be referred to as an AMF device or an AMF entity.

An N26 interface between the MME network element in the EPS network and the AMF network element in the 5G network in the system is used to implement interworking between the EPS network and the 5G network and a function of transferring a user context. Whether the N26 interface is supported between the MME network element and the AMF network element is optional in deployment implementation. Correspondingly, interworking between the EPS network and the 5G network includes the following two manners: interworking through the N26 interface, and interworking without the N26 interface.

The HSS+UDM network element 108 in the system is a network element that has functionalities of an HSS network element and a UDM network element, and can store subscription data of a user. For example, the subscription data of the user includes subscription data related to mobility management and subscription data related to session management. The HSS+UDM network element may also be referred to as an HSS+UDM device, an HSS+UDM entity, a UDM+HSS network element, a UDM+HSS device, or a UDM+HSS entity.

The SCEF+NEF network element 109 in the system is a network element that has functionalities of an SCEF network element and a NEF network element. The SCEF network element is a network element having a service capability exposure functionality, and the NEF network element is a network element supporting functionality of external exposure of a network function. For example, the external exposure functionality includes a monitoring functionality, a service provisioning functionality, and a policy and charging functionality. The SCEF+NEF network element may also be referred to as an SCEF+NEF device, an SCEF+NEF entity, a NEF+SCEF network element, a NEF+SCEF device, or a NEF+SCEF entity.

The foregoing network elements may be network elements implemented on dedicated hardware, or may be software instances run on dedicated hardware, or may be instances of virtualization functionalities on a proper platform. For example, the foregoing virtualization platform may be a cloud platform.

In addition, the embodiments of this application are also applicable to another future-oriented communications technology. Network architectures and service scenarios described in this application are intended to describe the technical solutions in this application more clearly, but are not intended to limit the technical solutions provided in this application. A person of ordinary skill in the art may know that as the network architectures evolve and a new service scenario emerges, the technical solutions provided in this application are also applicable to a similar technical problem.

The following uses a scenario of interworking between the 5G communications system and the EPS communications system shown in FIG. 1 as an example to describe in detail the technical solutions in this application using some embodiments. The following several embodiments may be combined with each other, and a same or similar concept or process may not be described repeatedly in some embodiments.

Figure 2:
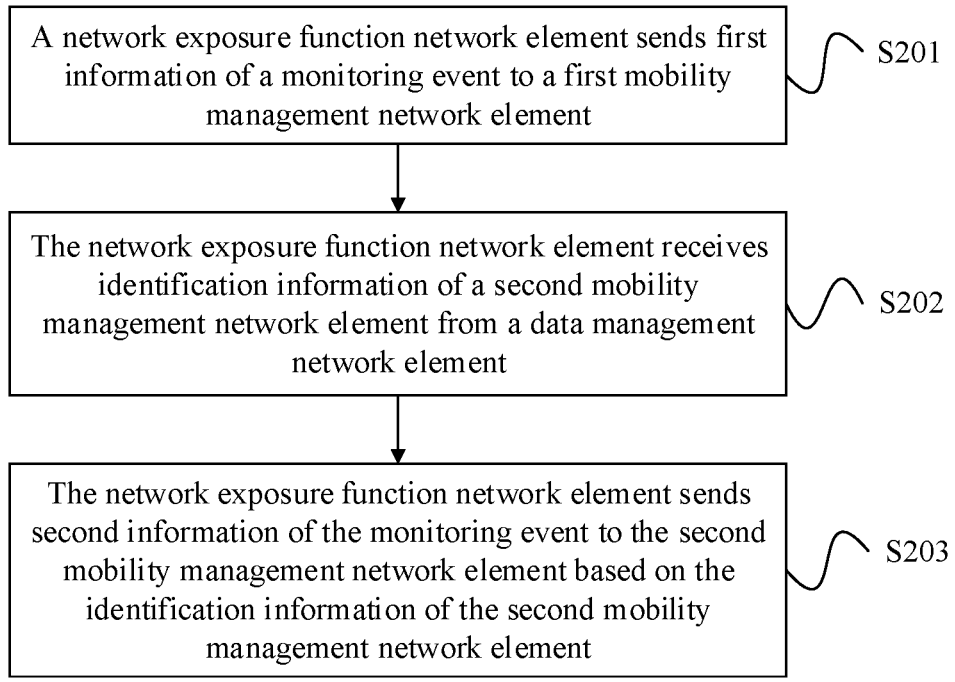
FIG. 2 shows a monitoring event management method according to an embodiment of this application.

FIG. 2 shows a monitoring event management method according to an embodiment of this application. According to the method, in a scenario of interworking between a 5G communications system and an EPS communications system, when an AMF network element does not support interworking with an MME network element through an N26 interface or an MME network element does not support interworking with an AMF network element through an N26 interface, after user equipment moves from a 5G network to an EPS network or moves from an EPS network to a 5G network, it is ensured that monitoring, in the network, on a monitoring event before the movement is not interrupted. As shown in FIG. 2, the method may include the following steps.

S201. A network exposure function network element sends first information of the monitoring event to a first mobility management network element. Correspondingly, the first mobility management network element receives the first information of the monitoring event from the network exposure function network element. The first mobility management network element supports interworking between a first network and a second network without an interface.

It should be noted that, that the first mobility management network element supports interworking between a first network and a second network without an interface may be understood as that the first mobility management network element does not support interworking with a second mobility management network element through an interface, or may be understood as that a second mobility management network element does not support interworking with the first mobility management network element through an interface.

For example, the first mobility management network element is the MME network element 103 or the AMF network element 110 in FIG. 1, and the network exposure function network element is the SCEF+NEF network element in FIG. 1.

In a first possible manner, when the user equipment is located in the EPS network, the first mobility management network element is the MME network element 103 in FIG. 1. A monitoring event to which the NEF+SCEF network element supports subscribing from the MME network element is shown in Table 1, and includes any one or more of the following: a loss of connectivity of user equipment (Loss of connectivity), user equipment reachability (UE reachability), a communication failure, availability after digital data network service failure, location reporting, and the number of users present in a specified area (Number of UEs present in a geographic area).

TABLE 1

Monitoring event supported by the NEF + SCEF network element

| Monitoring event | Subscription purpose | Application scenario |
| --- | --- | --- |
| Loss of connectivity | An application server subscribes to this event from the MME network element using the SCEF network element, and may specify, to the MME network element, TAU period duration of the terminal and maximum monitoring duration (that is, a mobile reachable timer) for determining whether a UE connection is lost. | If a data packet fails to be sent, it can be determined that the loss is caused by the terminal. |
| UE reachability | When an NB-IoT terminal supports a PSM or an eDRX mode, the terminal is unreachable most of the time. To perceive a reachable state of the NB-IoT terminal, the application server may subscribe to a UE reachability event from the MME using the SCEF, and start transmission of a downlink packet when the UE is reachable. | An IoT platform obtains a terminal status before sending a packet. |
| Communication failure | Detect a communication status of the UE. The MME reports this event when an air interface or an S1 interface is abnormally released. | If a data packet fails to be sent, it can be determined that the failure is caused by a link. |

TABLE 1-continued

Monitoring event supported by the NEF + SCEF network element

| Monitoring event | Subscription purpose | Application scenario |
| --- | --- | --- |
| Availability after digital data network service Failure | When receiving a downlink data notification (DDN) message and failing to page the terminal, the MME first records an identifier, and when the terminal is reconnected, the MME reports this event, | A cause of failing to send a previous data packet by the IoT can be located. When receiving this event, the IoT knows that the terminal is reachable. |
| Location Reporting | When a location accurate to an E-UTRAN cell global identifier (ECGI)/an eNodeB/a tracking area identity (TAI) changes, the MME reports the location, and the location may be a current location, or may be a location that is last learned of | Logistics tracking or dangerous animal tracking scenario |
| Number of UEs present in a geographic area | Query for a number of users at a specified location, | Some maintenance scenarios |

In the first possible manner, a parameter included in the first information that is of the monitoring event in Table 1 and that is sent by the network exposure function network element to the MME network element is shown in Table 2, and includes any one or more of the following: a monitoring type (Monitoring Type), an identifier of the network exposure function network element (NEF+SCEF ID), a reference identifier of the network exposure function network element (NEF+SCEF Reference ID), the maximum number of reports, monitoring duration, and a reference identifier of the network exposure function network element for deletion (SCEF Reference ID for Deletion).

TABLE 2

Parameter included in the first information of the monitoring event

| Main parameter of a subscription request | Parameter description |
| --- | --- |
| Monitoring Type | This parameter indicates a type of a subscription event. Values of this parameter are as follows: LOSS_OF_CONNECTIVITY (0) UE_REACHABILITY (1) LOCATION_REPORTING (2) CHANGE_OF_IMSI_IMEI(SV)_ASSOCIATION (3) ROAMING_STATUS (4) COMMUNICATION_FAILURE (5) AVAILABILITY_AFTER_DDN_FAILURE (6) NUMBER_OF_UES_PRESENT_IN_A_GEOGRAPHICAL_ AREA (7) |
| SCEF ID | This parameter indicates the SCEF ID. This information element and the SCEF reference ID may uniquely identify a subscription task across the entire network. |
| SCEF Reference ID | This information element and the SCEF ID can uniquely identify a subscription task across the entire network. When the NEF + SCEF creates a subscription task of a capability for a user or a batch of users, the NEF + SCEF allocates a NEF + SCEF reference ID to the subscription task. Therefore, one NEF + SCEF reference ID may correspond to a plurality of users, and one user may have a plurality of NEF + SCEF reference IDs. |
| Maximum Number of Reports | This parameter is optional and indicates the number of reports that need to be reported after a subscription task is delivered. When the number of reporting times of the MME exceeds this number, the MME does not report a report any more. When this information element is not carried, it indicates that only one subscription report is to be reported. |
| Monitoring Duration | This parameter is optional and indicates effective duration of a subscription request. After the duration expires, the MME stops reporting a report. When this parameter and the maximum number of reports are both carried, the reporting is stopped provided that one of the conditions is satisfied. |

TABLE 2-continued

Parameter included in the first information of the monitoring event

Main parameter of a
subscription request | Parameter description

| Main parameter of a subscription request | Parameter description |
|---|---|
| SCEF Reference ID for Deletion | This parameter indicates a subscription task to be deleted. |

In a second possible manner, when the user equipment is located in the 5G network, the first mobility management network element is the AMF network element 110 in FIG. 1. A monitoring event to which the NEF+SCEF network element supports subscribing from the AMF network element is the same as the monitoring event subscribed to from the MME network element. For details, refer to the description in Table 1.

For example, a parameter included in first information that is of the monitoring event in Table 1 and that is sent by the network exposure function network element to the AMF network element is shown in Table 3, and includes a subscription event type (Event ID) and a reporting event type (Event Reporting information). For example, the reporting event type includes one-time reporting, periodic reporting, or the like. Optionally, the parameter included in the first information further includes any one or more of the following: event filter information, a subscription correlation identifier, a notification correlation identifier, and a notification target address.

For example, the network exposure function network element invokes an Namf_EventExposure_Subscribe request service of the AMF network element to send the first information of the monitoring event to the AMF.

TABLE 3

Parameter included in the first information of the monitoring event

| Parameter | Parameter description |
|---|---|
| Event ID | This parameter indicates a subscription event type. |
| Event Filter Information | This parameter provides an event parameter type and an event parameter value that need to be matched, to satisfy a condition for notifying a subscription event ID. For example, the event parameter type may be "a region of interest", and a list of event parameter values may be a list of TAs; and an event filter depends on the event ID. The event filter information is provided based on the subscription event ID. During subscription, different event IDs may be associated with different event filter information. |
| Subscription Correlation ID | This parameter is allocated by a network function network element that receives the reporting event. |
| Notification Correlation ID | This parameter is allocated by a network function network element that subscribes to the event. |
| Event Reporting Information | The event reporting information defines a type of requested reporting (for example, one-time reporting or periodic reporting of the monitoring event, or event-based reporting). |
| Notification Target Address | This parameter indicates a network function network element that receives the subscription event. |

S202. A data management network element sends identification information of the second mobility management network element to the network exposure function network element. Correspondingly, the network exposure function network element receives the identification information of the second mobility management network element from the data management network element. The second mobility management network element does not support interworking with the first mobility management network element through an interface, the first mobility management network element serves the user equipment in the first network, and the second mobility management network element serves the user equipment in the second network.

For example, the data management network element is the HSS+UDM network element 108 in FIG. 1.

When the first mobility management network element is the MME network element 103 in FIG. 1, the second mobility management network element is the AMF network element 110 in FIG. 1, an interface between the second mobility management network element and the first mobility management network element is the N26 interface in FIG. 1, the first network is the EPS network, and the second network is the 5G network. The NEF+SCEF network element receives identification information of the AMF network element from the HSS+UDM network element. The AMF network element does not support interworking with the MME network element through the N26 interface.

When the first mobility management network element is the AMF network element 110 in FIG. 1, the second mobility management network element is the MME network element 103 in FIG. 1, an interface between the second mobility management network element and the first mobility management network element is the N26 interface in FIG. 1, the first network is the 5G network, and the second network is the EPS network. The NEF+SCEF network element receives identification information of the MME network element from the HSS+UDM network element. The MME network element does not support interworking with the AMF network element through the N26 interface.

For example, the network exposure function network element may receive the identification information of the second mobility management network element from the data management network element in the following two manners.

In one possible implementation, after receiving first indication information from the first mobility management network element, the network exposure function network element sends query information to the data management network element. The query information is used by the network exposure function network element to obtain the identification information of the second mobility management network element from the data management network element.

Optionally, the first indication information is used to indicate that the user equipment moves from the first network to the second network.

In the other possible implementation, the network exposure function network element subscribes from the data management network element to: sending, by the data management network element, the identification information of the second mobility management network element to the network exposure function network element when the user equipment moves from the first network to the second network.

Optionally, before the network exposure function network element subscribes from the data management network element, the network exposure function network element receives second indication information from the first mobility management network element. The second indication information is used to indicate that the first mobility management network element does not support interworking with the second mobility management network element through an interface.

S203. The network exposure function network element sends second information of the monitoring event to the second mobility management network element based on the identification information of the second mobility management network element. Correspondingly, the second mobility management network element receives the second information of the monitoring event from the network exposure function network element.

For example, when the second mobility management network element is the AMF network element 110 in FIG. 1, the NEF+SCEF network element sends the second information of the monitoring event to the AMF network element based on the identification information of the AMF network element. The monitoring event is the monitoring event in step S201, and for a parameter included in the second information, refer to the description of Table 3 in the second possible manner of step S201. Details are not described herein again.

When the second mobility management network element is the MME network element 103 in FIG. 1, the NEF+SCEF network element sends the second information of the monitoring event to the MME network element based on the identification information of the MME network element. The monitoring event is the monitoring event in step S201, and for a parameter included in the second information, refer to the description of Table 2 in the first possible manner of step S201. Details are not described herein again.

According to the method in this embodiment of the present disclosure, in the scenario shown in FIG. 1, when the second mobility management network element does not support interworking with the first mobility management network element through an interface, in the first network, the network exposure function network element may subscribe to the monitoring event by sending the first information of the monitoring event to the first mobility management network element. After the user equipment moves from the first network to the second network, the network exposure function network element sends the second information of the monitoring event to the second mobility management network element based on the obtained identification information of the second mobility management network element, to subscribe to a same monitoring event in the second network, thereby ensuring that monitoring, in the network, on the monitoring event before the movement is not interrupted.

Figure 3:
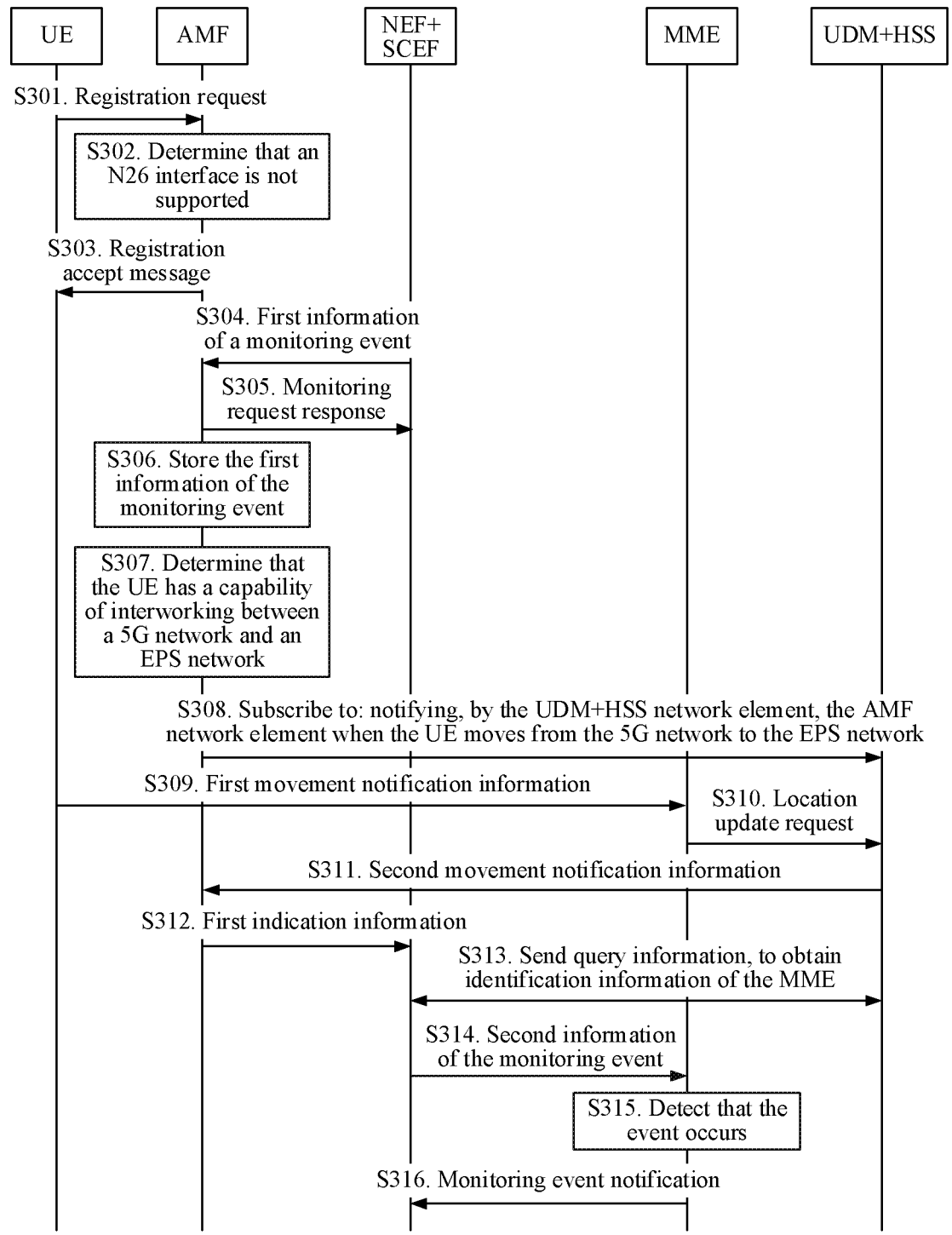
FIG. 3 is a flowchart of a monitoring event management method according to an embodiment of this application.

FIG. 3 is a flowchart of a monitoring event management method according to an embodiment of this application. The method shown in FIG. 3 is used to describe a scenario in which an AMF network element does not support interworking with an MME network element through an N26 interface, the AMF network element subscribes from an HSS+UDM network element to an event that UE registers with an EPS network. When the AMF network element learns from the HSS+UDM network element that the UE moves from the 5G network to the EPS network, the AMF network element triggers a NEF+SCEF network element to obtain identification information of the MME network element from the HSS+UDM network element, and then, the NEF+SCEF network element sends second information of the monitoring event to the MME network element. FIG. 3 is described with reference to FIG. 1 and FIG. 2. As shown in FIG. 3, the method may include the following steps.

S301. The UE sends a registration request to the AMF network element. Correspondingly, the AMF network element receives the registration request from the UE.

For example, the UE is the user equipment 101 in FIG. 1, and the AMF network element is the AMF network element 110 in FIG. 1.

S302. The AMF network element determines that the N26 interface is not supported.

For example, the N26 interface is the N26 interface between the AMF network element and the MME network element in FIG. 1.

For example, the AMF network element determines, based on local configuration information, that the N26 interface is not supported.

S303. The AMF network element sends a registration accept message to the UE. Correspondingly, the UE receives the registration accept message from the AMF network element.

For example, the registration accept message includes indication information indicating that the AMF network element does not support the N26 interface. After the UE moves to the EPS network, the UE may determine, based on the indication information, to initiate an attach procedure or a TAU procedure.

S304. The NEF+SCEF network element sends first information of the monitoring event to the AMF network element. Correspondingly, the AMF network element receives the first information of the monitoring event from the NEF+SCEF network element.

For example, the NEF+SCEF network element is the SCEF+NEF network element in FIG. 1 or the network exposure function network element in FIG. 2. For the monitoring event, refer to the description of the monitoring event to which the NEF+SCEF network element supports subscribing from the AMF network element in the second possible manner in FIG. 2, that is, refer to the description in Table 1. For a parameter included in the first information of the monitoring event, refer to the description of Table 3 in the second possible manner in FIG. 2. Details are not described herein again.

For example, the NEF+SCEF network element invokes an Namf_EventExposure_Subscribe request service of the AMF network element to send the first information of the monitoring event to the AMF network element. The first information of the monitoring event includes an event ID and event reporting information. The event ID indicates an event type of the subscribed-to monitoring event, and the event reporting information is used to indicate a type of reporting the monitoring event by the AMF network element under request, for example, one-time reporting or periodic reporting.

S305. The AMF network element sends a monitoring request response to the NEF+SCEF network element. Correspondingly, the NEF+SCEF network element receives the monitoring request response from the AMF network element.

For example, the AMF network element invokes an Namf_EventExposure_Subscribe response service to send the monitoring request response to the NEF+SCEF network element.

S306. The AMF network element stores the first information of the monitoring event.

S307. The AMF network element determines that the UE has a capability of interworking between the 5G network and the EPS network.

For example, the AMF network element determines, based on subscription data of the UE, whether the UE has the capability of interworking between the 5G network and the EPS network.

It should be noted that S306 and S307 are optional steps, and an execution sequence of S306 and S307 is not limited in the present disclosure.

S308. The AMF network element subscribes from the UDM+HSS network element to: notifying, by the UDM+HSS network element, the AMF network element when the UE moves from the 5G network to the EPS network.

For example, the UDM+HSS network element is the HSS+UDM network element 108 in FIG. 1.

For example, the AMF network element invokes an Nudm_EventExposure_Subscribe service of the UDM+HSS network element to subscribe from the UDM+HSS network element to: notifying the AMF network element when the UE moves from the 5G network to the EPS network. The Nudm_EventExposure_Subscribe service includes a permanent identifier of the UE and the subscription event: moving, by the UE, from the 5G network to the EPS network.

S309. The UE sends first movement notification information to the MME network element. Correspondingly, the MME network element receives the first movement notification information from the UE.

For example, the MME network element is the MME network element 103 in FIG. 1.

For example, after moving to the EPS network, the UE initiates the attach procedure, and sends the first movement notification information to the MME network element using an attach request message. The first movement notification information is used to indicate that the UE moves from the 5G network to the EPS network.

S310. The MME network element sends a location update request to the UDM+HSS network element. Correspondingly, the UDM+HSS network element receives the location update request from the MME network element.

For example, the location update request includes the permanent identifier of the UE and the identification information of the MME.

After receiving the location update request from the MME network element, the UDM+HSS network element can learn that the UE moves from the 5G network to the EPS network.

S311. The UDM+HSS network element sends second movement notification information to the AMF network element. Correspondingly, the AMF network element receives the second movement notification information from the UDM+HSS network element.

For example, the UDM+HSS network element invokes an Nudm_EventExposure_Notify service based on the subscription of the AMF in step S308, to send the second movement notification information to the AMF network element. The second movement notification information is used to indicate that the UE moves from the 5G network to the EPS network.

After receiving the second movement notification information, the AMF network element can learn that the UE moves from the 5G network to the EPS network.

S312. The AMF network element sends first indication information to the NEF+SCEF network element. Correspondingly, the NEF+SCEF network element receives the first indication information from the AMF network element.

For example, the AMF network element invokes the Namf_EventExposure_Notify service to send the first indication information to the NEF+SCEF network element. The first indication information is used to trigger the NEF+SCEF network element to query the UDM+HSS network element for the identification information of the MME network element.

Optionally, the first indication information is further used to indicate that the UE moves from the 5G network to the EPS network.

S313. The NEF+SCEF network element sends query information to the UDM+HSS network element, where the query information is used by the NEF+SCEF network element to obtain the identification information of the MME network element from the UDM+HSS network element.

For example, the query information includes the permanent identifier of the UE. After receiving the query information, the UDM+HSS network element sends the identification information of the MME network element to the NEF+SCEF network element.

S314. The NEF+SCEF network element sends second information of the monitoring event to the MME network element. Correspondingly, the MME network element receives the second information of the monitoring event from the NEF+SCEF network element.

It should be noted that the monitoring event in S314 includes the monitoring event in S304.

For example, the NEF+SCEF network element sends the second information of the monitoring event to the MME network element using a monitoring request message.

For example, for a parameter included in the second information of the monitoring event, refer to the description of Table 2 in the first possible manner in FIG. 2. Details are not described herein again.

S315. The MME network element detects that the event occurs.

S316. The MME network element sends a monitoring event notification to the NEF+SCEF network element. Correspondingly, the NEF+SCEF network element receives the monitoring event notification from the MME network element.

With reference to the description of the foregoing embodiment, the present disclosure discloses the following monitoring event management method: The first mobility management (AMF) network element subscribes from the data management (UDM+HSS) network element to: notifying, by the data management network element, the first mobility management network element when the UE moves from the first (5G) network to the second (EPS) network, where the first mobility management network element serves the user equipment in the first network. The first mobility management network element receives the notification from the data management network element, to learn that the user equipment moves from the first network to the second network. The first mobility management network element sends the indication information to the network exposure function (NEF+SCEF) network element, where the indication information is used to trigger the network exposure function network element to query the data management network element for the identification information of the second mobility management (MME) network element, the second mobility management network element serves the user equipment in the second network, and the first mobility management network element does not support interworking with the second mobility management network element through an interface (N26). According to the method in this embodiment of the present disclosure, in the scenario shown in FIG. 1, when the AMF network element does not support interworking with the MME network element through the N26 interface, after the user equipment moves from the 5G network to the EPS network, the NEF+SCEF network element sends the second information of the monitoring event to the MME network element based on the obtained identification information of the MME network element, to subscribe, in the EPS network, to a monitoring event that is the same as that in the 5G network, thereby ensuring that monitoring, in the network, on the monitoring event before the movement is not interrupted.

Figure 4:
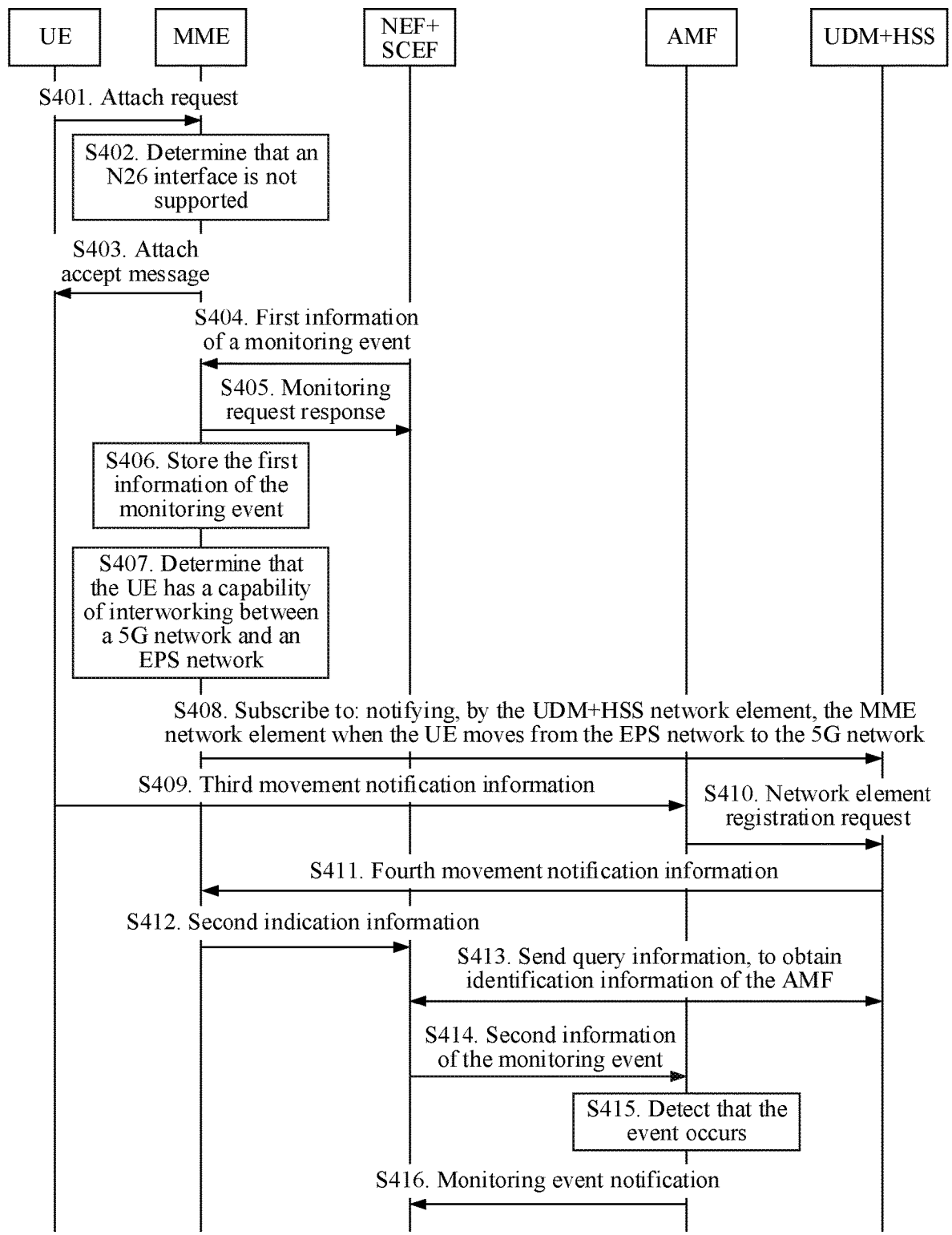
FIG. 4 is a flowchart of another monitoring event management method according to an embodiment of this application.

FIG. 4 is a flowchart of another monitoring event management method according to an embodiment of this application. The method shown in FIG. 4 is used to describe a scenario in which an AMF network element does not support interworking with an MME network element through an N26 interface, the MME network element subscribes from an HSS+UDM network element to an event that UE registers with a 5G network. When the MME network element learns from the HSS+UDM network element that the UE moves from an EPS network to the 5G network, the MME network element triggers a NEF+SCEF network element to obtain identification information of the AMF network element from the HSS+UDM network element, and then, the NEF+SCEF network element sends second information of the monitoring event to the AMF network element. FIG. 4 is described with reference to FIG. 3. As shown in FIG. 4, the method may include the following steps.

S401. The UE sends an attach request to the MME network element. Correspondingly, the MME network element receives the attach request from the UE.

For example, the UE is the user equipment 101 in FIG. 1, and the MME network element is the MME network element 103 in FIG. 1.

S402. The MME network element determines that the N26 interface is not supported.

For example, the N26 interface is the N26 interface between the AMF network element and the MME network element in FIG. 1. For example, the MME network element determines, based on local configuration information, that the N26 interface is not supported.

S403. The MME network element sends an attach accept message to the UE. Correspondingly, the UE receives the attach accept message from the MME network element.

For example, the attach accept message includes indication information indicating that the MME network element does not support the N26 interface. After the UE moves to the 5G network, the UE may determine, based on the indication information, to initiate an attach procedure or a TAU procedure.

S404. The NEF+SCEF network element sends first information of the monitoring event to the MME network element. Correspondingly, the MME network element receives the first information of the monitoring event from the NEF+SCEF network element.

For example, the NEF+SCEF network element is the SCEF+NEF network element in FIG. 1 or the network exposure function network element in FIG. 2.

For example, the NEF+SCEF network element sends the first information of the monitoring event to the MME network element using a monitoring request message. For the monitoring event, refer to the description of step S304 in FIG. 3. For a parameter included in the first information of the monitoring event, refer to the description of Table 2 in the first possible manner in FIG. 2. Details are not described herein again.

S405. The MME network element sends a monitoring request response to the NEF+SCEF network element. Correspondingly, the NEF+SCEF network element receives the monitoring request response from the MME network element.

For example, the MME network element sends the monitoring request response to the NEF+SCEF network element using a monitoring response message.

S406. The MME network element stores the first information of the monitoring event.

S407. The MME network element determines that the UE has a capability of interworking between the 5G network and the EPS network.

It should be noted that S406 and S407 are optional steps, and an execution sequence of S406 and S407 is not limited in the present disclosure.

S408. The MME network element subscribes from the UDM+HSS network element to: notifying, by the UDM+HSS network element, the MME network element when the UE moves from the EPS network to the 5G network.

For example, the UDM+HSS network element is the HSS+UDM network element 108 in FIG. 1.

For example, the MME network element sends a subscription request message to the UDM+HSS network element to subscribe from the UDM+HSS network element to: notifying the MME network element when the UE moves from the EPS network to the 5G network. The subscription request message includes a permanent identifier of the UE and the subscription event: moving, by the UE, from the EPS network to the 5G network.

S409. The UE sends third movement notification information to the AMF network element. Correspondingly, the AMF network element receives the third movement notification information from the UE.

For example, the AMF network element is the AMF network element 110 in FIG. 1.

For example, after moving to the 5G network, the UE initiates a registration procedure, and sends the third movement notification information to the AMF network element using a registration request message. The third movement notification information is used to indicate that the UE moves from the EPS network to the 5G network.

S410. The AMF network element sends a network element registration request to the UDM+HSS network element. Correspondingly, the UDM+HSS network element receives the network element registration request from the AMF network element.

For example, the AMF network element invokes an Nudm_UECM_Registration service of the UDM+HSS network element to send the network element registration request. For example, the network element registration request includes the permanent identifier of the UE and the identification information of the AMF.

S411. The UDM+HSS network element sends fourth movement notification information to the MME network element. Correspondingly, the MME network element receives the fourth movement notification information from the UDM+HSS network element.

For example, the UDM+HSS network element sends the fourth movement notification information to the MME network element using a subscription notification message based on the subscription of the MME network element in step S408. The fourth movement notification information is used to indicate that the UE moves from the EPS network to the 5G network. After receiving the fourth movement notification information, the MME network element can learn that the UE moves from the EPS network to the 5G network.

S412. The MME network element sends second indication information to the NEF+SCEF network element. Correspondingly, the NEF+SCEF network element receives the second indication information from the MME network element.

For example, the MME network element sends the second indication information to the NEF+SCEF network element using a notification message. The second indication information is used to trigger the NEF+SCEF network element to send query information to the UDM+HSS network element, to obtain the identification information of the AMF network element.

Optionally, the second indication information is further used to indicate that the UE moves from the EPS network to the 5G network.

S413. The NEF+SCEF network element sends the query information to the UDM+HSS network element, where the query information is used by the NEF+SCEF network element to obtain the identification information of the AMF network element from the UDM+HSS network element.

For example, the NEF+SCEF network element invokes an Nudm_UECM_Registration service to send the query information to the UDM+HSS network element, to query for the identification information of the AMF network element. For example, the query information includes the permanent identifier of the UE.

S414. The NEF+SCEF network element sends second information of the monitoring event to the AMF network element. Correspondingly, the AMF network element receives the second information of the monitoring event from the NEF+SCEF network element.

It should be noted that the monitoring event in S414 includes the monitoring event in S404.

For example, the NEF+SCEF network element invokes an Namf_EventExposure_Subscribe request service of the AMF network element to send the second information of the monitoring event to the AMF network element.

For example, for a parameter included in the second information of the monitoring event, refer to the description of Table 3 in the second possible manner in FIG. 2. Details are not described herein again.

For steps S415 and S416, refer to the descriptions of steps S315 and S316 in FIG. 3. Details are not described herein again.

With reference to the description of the foregoing embodiment, the present disclosure discloses the following monitoring event management method: The first mobility management (MME) network element subscribes from the data management (UDM+HSS) network element to: notifying, by the data management network element, the first mobility management network element when the UE moves from the first (EPS) network to the second (5G) network, where the first mobility management network element serves the user equipment in the first network. The first mobility management network element receives the notification from the data management network element, to learn that the user equipment moves from the first network to the second network. The first mobility management network element sends the indication information to the network exposure function (NEF+SCEF) network element, where the indication information is used to trigger the network exposure function network element to query the data management network element for the identification information of the second mobility management (AMF) network element, the second mobility management network element serves the user equipment in the second network, and the first mobility management network element does not support interworking with the second mobility management network element through an interface (N26).

According to the method in this embodiment of the present disclosure, in the scenario shown in FIG. 1, when the AMF network element does not support interworking with the MME network element through the N26 interface, after the user equipment moves from the EPS network to the 5G network, the NEF+SCEF network element sends the second information of the monitoring event to the AMF network element based on the obtained identification information of the AMF network element, to subscribe, in the 5G network, to a monitoring event that is the same as that in the EPS network, thereby ensuring that monitoring, in the network, on the monitoring event before the movement is not interrupted.

Figure 5:
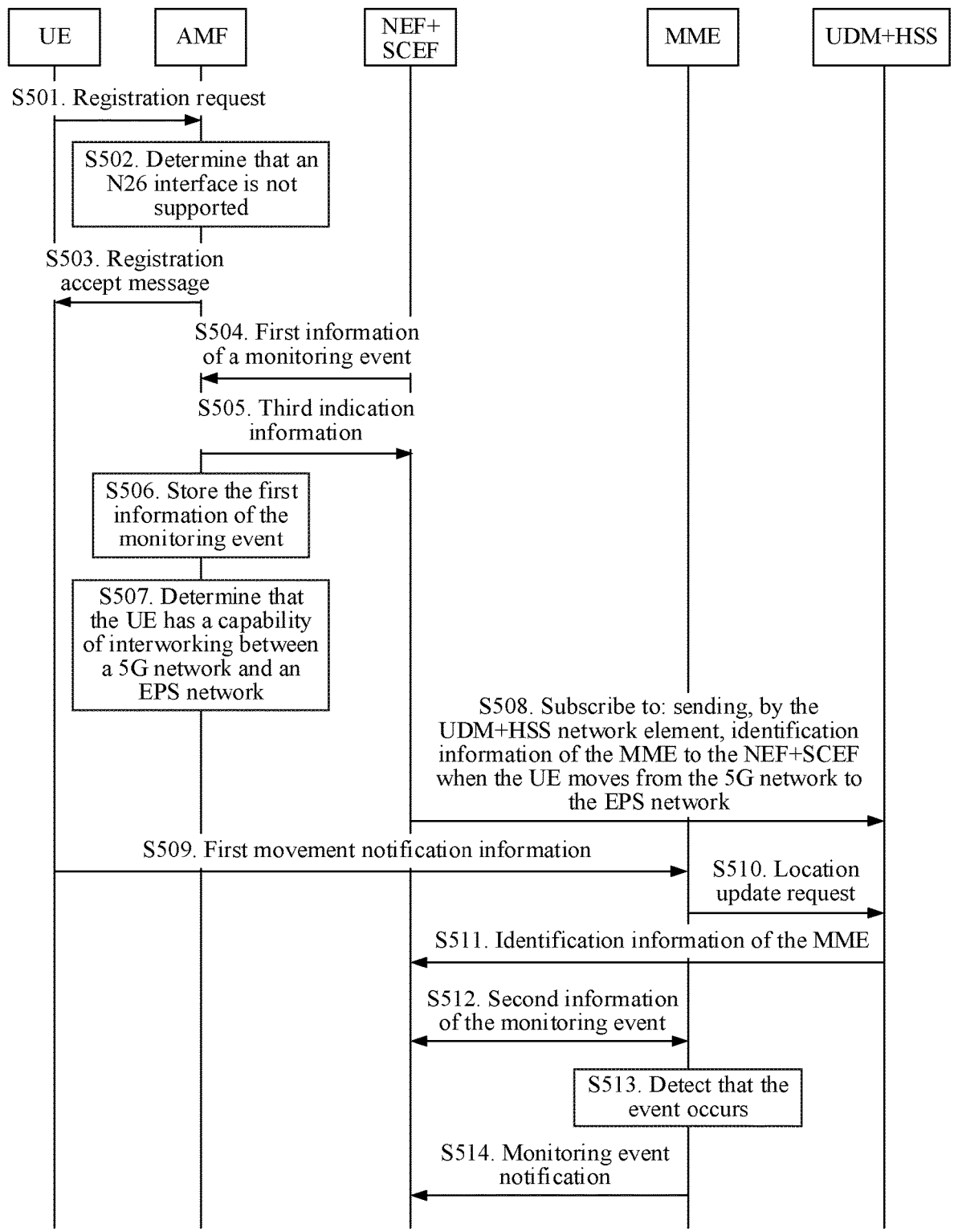
FIG. 5 is a flowchart of another monitoring event management method according to an embodiment of this application.

FIG. 5 is a flowchart of another monitoring event management method according to an embodiment of this application. The method shown in FIG. 5 is used to describe a scenario in which an AMF network element supports interworking between an 5G network and an EPS network without an interface (an N26 interface), when a NEF+SCEF network element sends first information of a monitoring event to the AMF network element, the AMF network element notifies the NEF+SCEF network element that the AMF network element does not support the N26 interface, and triggers the NEF+SCEF network element to subscribe to and obtain identification information of an MME network element from an HSS+UDM network element. When UE moves from the 5G network to the EPS network, the HSS+UDM network element sends the identification information of the MME network element to the NEF+SCEF network element, and then the NEF+SCEF network element sends second information of the monitoring event to the MME network element. FIG. 5 is described with reference to FIG. 1, FIG. 2, and FIG. 3. As shown in FIG. 5, the method may include the following steps.

For steps S501 to S504, refer to the descriptions of steps S301 to S304 in FIG. 3. Details are not described herein again.

S505. The AMF network element sends third indication information to the NEF+SCEF network element. Correspondingly, the NEF+SCEF network element receives the third indication information from the AMF network element. The third indication information is used to indicate that the AMF network element supports interworking between the 5G network and the EPS network without an interface (an N26 interface).

For example, the AMF network element sends the third indication information to the NEF+SCEF network element using an Namf_EventExposure_Subscribe response service.

It should be noted that, that the AMF network element supports interworking between the 5G network and the EPS network without an interface (an N26 interface) may be understood as that the AMF network element does not support interworking with the MME network element through an interface (an N26 interface), or may be understood as that the MME network element does not support interworking with the AMF network element through an interface (an N26 interface).

For steps S506 and S507, refer to the descriptions of steps S306 and S307 in FIG. 3. Details are not described herein again. It should be noted that S506 and S507 are optional steps, and an execution sequence of S506 and S507 is not limited in the present disclosure.

S508. The NEF+SCEF network element subscribes from the UDM+HSS network element to: sending, by the UDM+

HSS network element, the identification information of the MME network element to the NEF+SCEF network element when the UE moves from the 5G network to the EPS network.

For example, the UDM+HSS network element is the HSS+UDM network element 108 in FIG. 1.

For example, the NEF+SCEF network element invokes an Nudm_EventExposure_Subscribe service of the UDM+HSS network element to subscribe from the UDM+HSS network element to: sending the identification information of the MME network element to the NEF+SCEF network element when the UE moves from the 5G network to the EPS network. The Nudm_EventExposure_Subscribe service includes a permanent identifier of the UE and the subscription event: the identification information of the MME network element serving the UE in the EPS network.

For steps S509 and S510, refer to the descriptions of steps S309 and S310 in FIG. 3. Details are not described herein again.

S511. The UDM+HSS network element sends the identification information of the MME network element to the NEF+SCEF network element. Correspondingly, the NEF+SCEF network element receives the identification information of the MME network element from the UDM+HSS network element.

For example, the UDM+HSS network element invokes an Nudm_EventExposure_notify service based on the subscription of the NEF+SCEF network element in step S508, to send the identification information of the MME network element to the NEF+SCEF network element.

For steps S512 to S514, refer to the descriptions of steps S314 to S316 in FIG. 3. Details are not described herein again.

With reference to the description of the foregoing embodiment, the present disclosure discloses the following monitoring event management method: The first mobility management (AMF) network element determines that the first mobility management network element supports interworking between the first (5G) network and the second (EPS) network without an interface (for example, an N26 interface), where the first mobility management network element serves the UE in the first network, and the second mobility management network element serves the user equipment in the second network; and the first mobility management network element sends the indication information to the network exposure function (NEF+SCEF) network element, where the indication information is used to indicate that the first mobility management network element does not support interworking with the second mobility management network element through an interface.

According to the method in this embodiment of the present disclosure, in the scenario shown in FIG. 1, when the AMF network element does not support interworking with the MME network element through the N26 interface, after the user equipment moves from the 5G network to the EPS network, the NEF+SCEF network element sends the second information of the monitoring event to the MME network element based on the obtained identification information of the MME network element, to subscribe, in the EPS network, to a monitoring event that is the same as that in the 5G network, thereby ensuring that monitoring, in the network, on the monitoring event before the movement is not interrupted.

Figure 6:
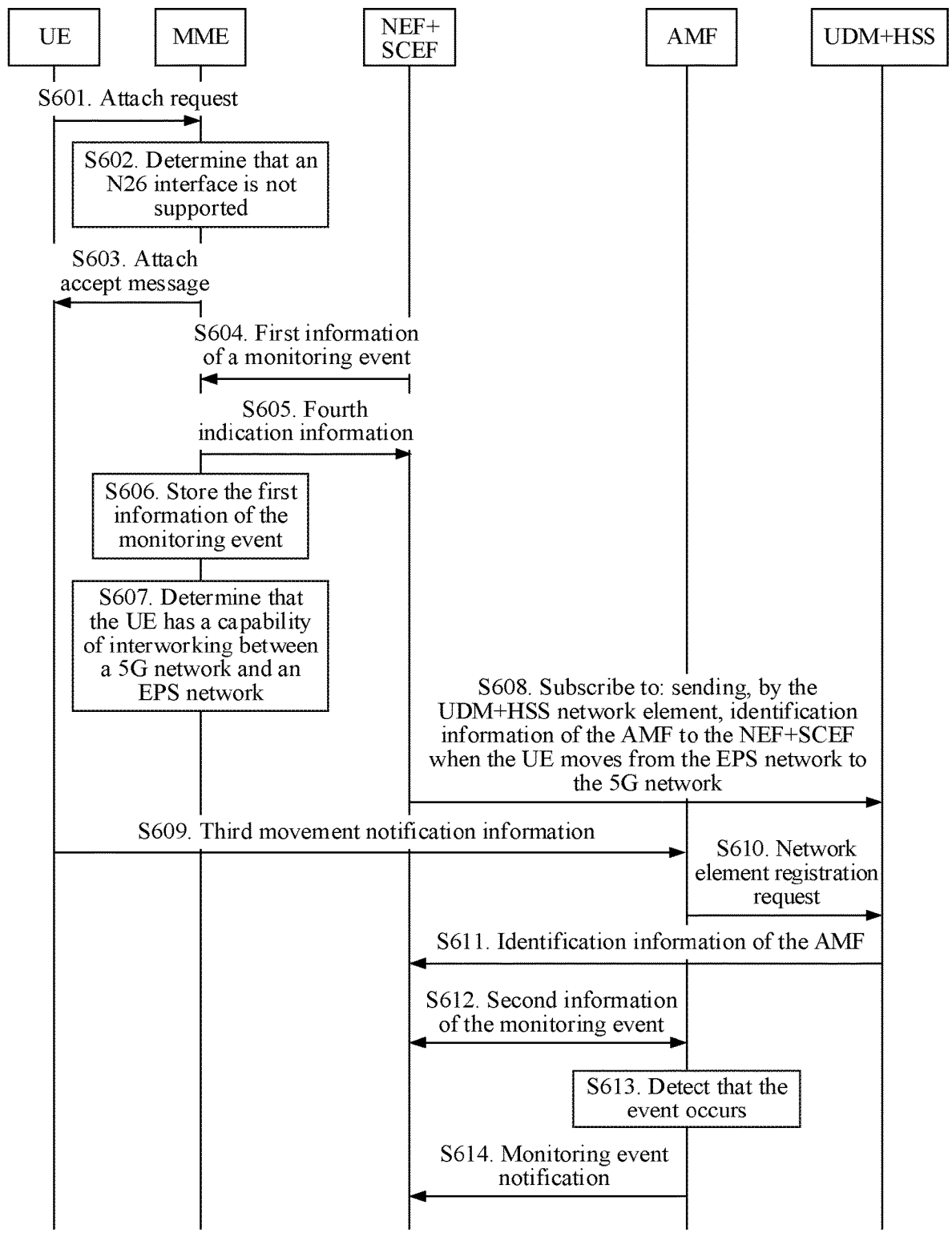
FIG. 6 is a flowchart of another monitoring event management method according to an embodiment of this application.

FIG. 6 is a flowchart of another monitoring event management method according to an embodiment of this application. The method shown in FIG. 6 is used to describe a scenario in which an MME network element supports interworking between a 5G network and an EPS network without an interface (an N26 interface), when a NEF+SCEF network element sends first information of a monitoring event to the MME network element, the MME network element notifies the NEF+SCEF network element that the MME network element does not support the N26 interface, and triggers the NEF+SCEF network element to subscribe to and obtain identification information of an AMF network element from an HSS+UDM network element. When UE moves from the EPS network to the 5G network, the HSS+UDM network element sends the identification information of the AMF network element to the NEF+SCEF network element, and then the NEF+SCEF network element sends second information of the monitoring event to the AMF network element. FIG. 6 is described with reference to FIG. 1, FIG. 2, and FIG. 4. As shown in FIG. 6, the method may include the following steps.

For steps S601 to S604, refer to the descriptions of steps S401 to S404 in FIG. 4. Details are not described herein again.

S605. The MME network element sends fourth indication information to the NEF+SCEF network element. Correspondingly, the NEF+SCEF network element receives the fourth indication information from the MME network element. The fourth indication information is used to indicate that the MME network element supports interworking between the 5G network and the EPS network without an interface (an N26 interface).

For example, the MME network element sends the fourth indication information to the NEF+SCEF network element using a monitoring request response message.

It should be noted that, that the MME network element supports interworking between the 5G network and the EPS network without an interface (an N26 interface) may be understood as that the MME network element does not support interworking with the AMF network element through an interface (an N26 interface), or may be understood as that the AMF network element does not support interworking with the MME network element through an interface (an N26 interface).

For steps S606 and S607, refer to the descriptions of steps S406 and S407 in FIG. 4. Details are not described herein again. It should be noted that S606 and S607 are optional steps, and an execution sequence of S606 and S607 is not limited in the present disclosure.

S608. The NEF+SCEF network element subscribes from the UDM+HSS network element to: sending, by the UDM+HSS network element, the identification information of the AMF network element to the NEF+SCEF network element when the UE moves from the EPS network to the 5G network.

For example, the UDM+HSS network element is the HSS+UDM network element 108 in FIG. 1.

For example, the NEF+SCEF network element sends a subscription request message to the UDM+HSS network element, to subscribe from the UDM+HSS network element to: sending the identification information of the AMF network element to the NEF+SCEF network element when the UE moves from the EPS network to the 5G network. The subscription request message includes a permanent identifier of the UE.

For steps S609 and S610, refer to the descriptions of steps S409 and S410 in FIG. 4. Details are not described herein again.

S611. The UDM+HSS network element sends the identification information of the AMF network element to the NEF+SCEF network element. Correspondingly, the NEF+

SCEF network element receives the identification information of the AMF network element from the UDM+HSS network element.

For example, the UDM+HSS network element sends the identification information of the AMF network element to the NEF+SCEF network element using a subscription notification message based on the subscription of the NEF+SCEF network element in step S608.

For steps S612 to S614, refer to the descriptions of steps S414 to S416 in FIG. 4. Details are not described herein again.

With reference to the description of the foregoing embodiment, the present disclosure discloses the following monitoring event management method: The first mobility management (MME) network element determines that the first mobility management network element supports interworking between the first (EPS) network and the second (5G) network without an interface (for example, an N26 interface), where the first mobility management network element serves the UE in the first network, and the second mobility management network element serves the user equipment in the second network. The first mobility management network element sends the indication information to the network exposure function (NEF+SCEF) network element, where the indication information is used to indicate that the first mobility management network element does not support interworking with the second mobility management network element through an interface.

According to the method in this embodiment of the present disclosure, in the scenario shown in FIG. 1, when the AMF network element does not support interworking with the MME network element through the N26 interface, after the user equipment moves from the EPS network to the 5G network, the NEF+SCEF network element sends the second information of the monitoring event to the AMF network element based on the obtained identification information of the AMF network element, to subscribe, in the 5G network, to a monitoring event that is the same as that in the EPS network, thereby ensuring that monitoring, in the network, on the monitoring event before the movement is not interrupted.

Figure 7:
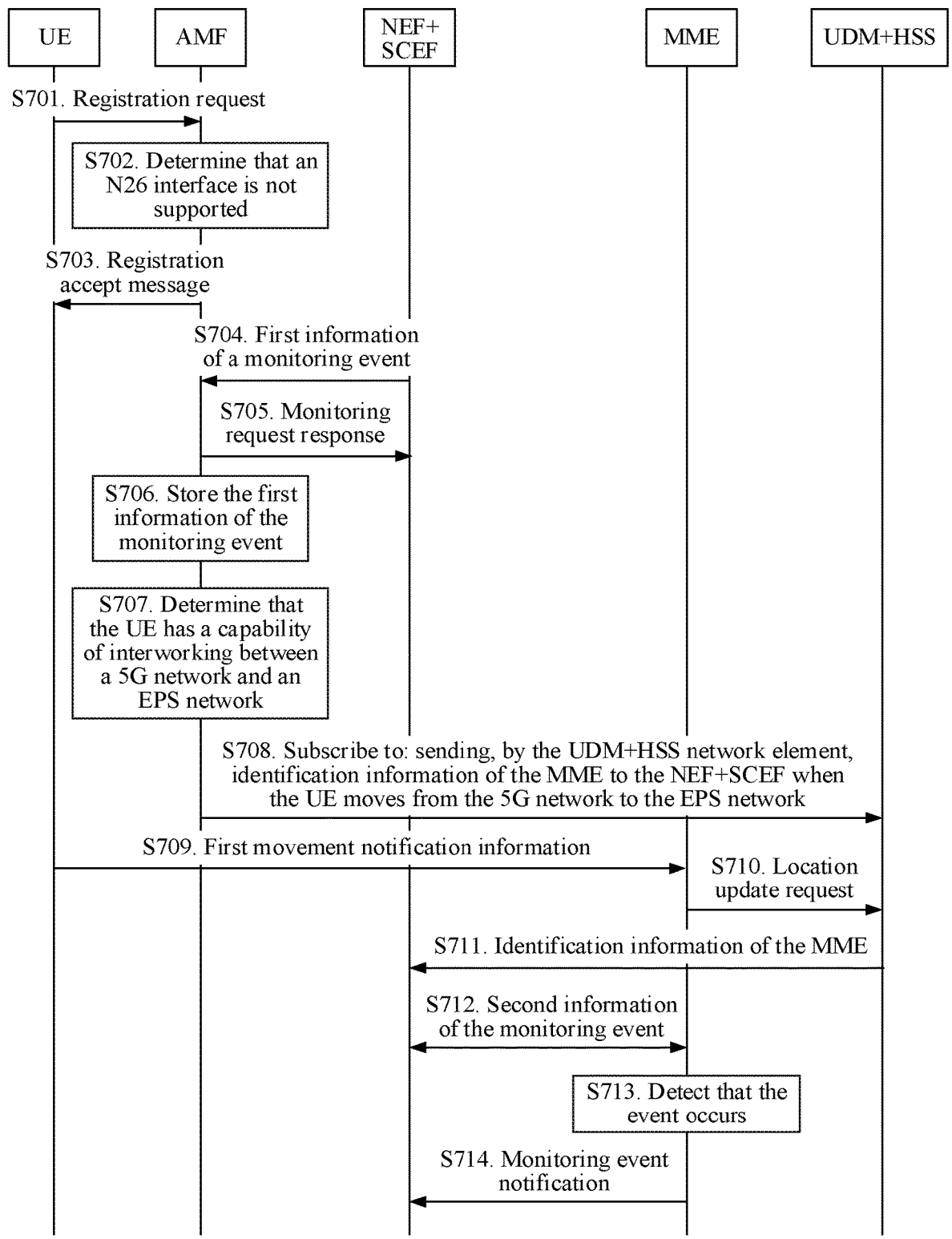
FIG. 7 is a flowchart of another monitoring event management method according to an embodiment of this application.

FIG. 7 is a flowchart of another monitoring event management method according to an embodiment of this application. The method shown in FIG. 7 is used to describe a scenario in which an AMF network element does not support interworking with an MME network element through an N26 interface, when a NEF+SCEF network element sends first information of a monitoring event to the AMF network element, the AMF network element determines that the AMF network element does not support the N26 interface, and subscribes from an HSS+UDM network element, such that the NEF+SCEF network element obtains identification information of the MME network element. When UE moves from a 5G network to an EPS network, the HSS+UDM network element sends the identification information of the MME network element to the NEF+SCEF network element, and then the NEF+SCEF network element sends second information of the monitoring event to the MME network element. FIG. 7 is described with reference to FIG. 1, FIG. 2, FIG. 3, and FIG. 5. As shown in FIG. 7, the method may include the following steps.

For steps S701 to S707, refer to the descriptions of steps S301 to S307 in FIG. 3. Details are not described herein again.

It should be noted that S706 and S707 are optional steps, and an execution sequence of S706 and S707 is not limited in the present disclosure.

S708. The AMF network element subscribes from the UDM+HSS network element to: sending, by the UDM+HSS network element, the identification information of the MME network element to the NEF+SCEF network element when the UE moves from the 5G network to the EPS network.

For example, the AMF network element invokes an Nudm_EventExposure_Subscribe service of the UDM+HSS network element to subscribe from the UDM+HSS network element to: sending the identification information of the MME network element to the NEF+SCEF network element when the UE moves from the 5G network to the EPS network. The Nudm_EventExposure_Subscribe service includes a permanent identifier of the UE and the subscription event: an ID of the MME that serves the UE in the EPS network and identification information of a notification network element (notification NF), that is, the NEF network element.

For steps S709 to S714, refer to the descriptions of steps S509 to S514 in FIG. 5. Details are not described herein again.

With reference to the description of the foregoing embodiment, the present disclosure discloses the following monitoring event management method: The first mobility management (AMF) network element determines that the first mobility management network element does not support interworking with the second mobility management (MME) network element through an interface (an N26 interface). The first mobility management network element subscribes from the data management (UDM+HSS) network element to: sending, by the data management network element, the identification information of the second mobility management network element to the network exposure function (NEF+SCEF) network element when the UE moves from the first (5G) network to the second (EPS) network, where the first mobility management network element serves the user equipment in the first network, and the second mobility management network element serves the user equipment in the second network.

According to the method in this embodiment of the present disclosure, in the scenario shown in FIG. 1, when the AMF network element does not support interworking with the MME network element through the N26 interface, after the user equipment moves from the 5G network to the EPS network, the NEF+SCEF network element sends the second information of the monitoring event to the MME network element based on the obtained identification information of the MME network element, to subscribe, in the EPS network, to a monitoring event that is the same as that in the 5G network, thereby ensuring that monitoring, in the network, on the monitoring event before the movement is not interrupted.

Figure 8:
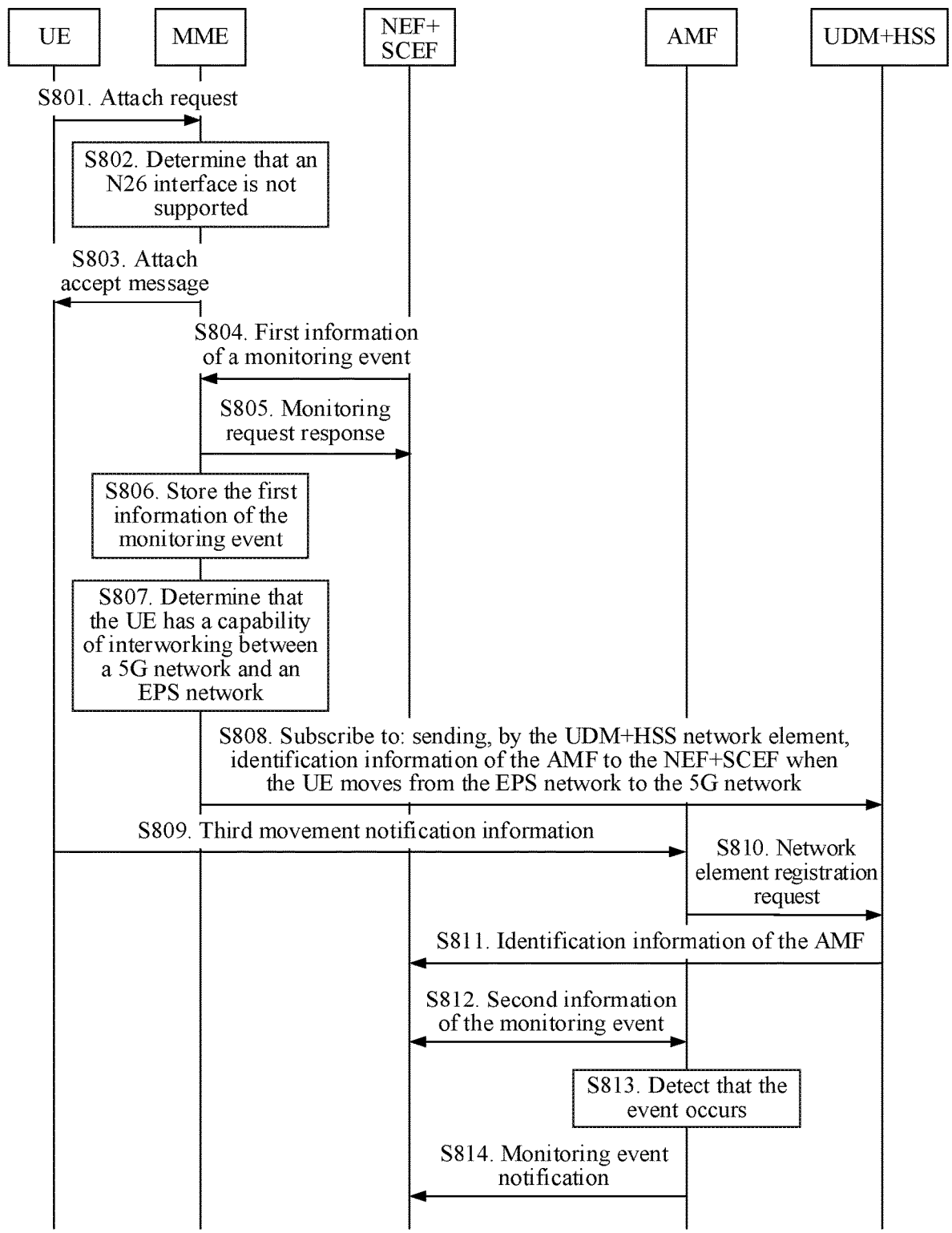
FIG. 8 is a flowchart of another monitoring event management method according to an embodiment of this application.

FIG. 8 is a flowchart of another monitoring event management method according to an embodiment of this application. The method shown in FIG. 8 is used to describe a scenario in which an AMF network element does not support interworking with an MME network element through an N26 interface, when a NEF+SCEF network element sends first information of a monitoring event to the MME network element, the MME network element determines that the MME network element does not support the N26 interface, and subscribes from an HSS+UDM network element, such that the NEF+SCEF network element obtains identification information of the AMF network element. When UE moves from an EPS network to a 5G network, the HSS+UDM network element sends the identification information of the AMF network element to the NEF+SCEF network element, and then the NEF+SCEF network element sends second information of the monitoring event to the AMF network element. FIG. 8 is described with reference to FIG. 1, FIG. 2, FIG. 4, and FIG. 6. As shown in FIG. 8, the method may include the following steps.

For steps S801 to S807, refer to the descriptions of steps S401 to S407 in FIG. 4. Details are not described herein again.

It should be noted that S806 and S807 are optional steps, and an execution sequence of S806 and S807 is not limited in the present disclosure.

S808. The MME network element subscribes from the UDM+HSS network element to: sending, by the UDM+HSS network element, the identification information of the AMF network element to the NEF+SCEF network element when the UE moves from the EPS network to the 5G network.

For example, the AMF network element sends a subscription request message to the UDM+HSS network element, to subscribe from the UDM+HSS network element to: sending the identification information of the AMF network element to the NEF+SCEF network element when the UE moves from the EPS network to the 5G network. The subscription request message includes a permanent identifier of the UE, identification information of the serving AMF, and identification information of the NEF+SCEF network element.

For steps S809 to S814, refer to the descriptions of steps S609 to S614 in FIG. 6. Details are not described herein again.

With reference to the description of the foregoing embodiment, the present disclosure discloses the following monitoring event management method: The first mobility management (MME) network element determines that the first mobility management network element does not support interworking with the second mobility management (AMF) network element through an interface (an N26 interface). The first mobility management network element subscribes from the data management (UDM+HSS) network element to: sending, by the data management network element, the identification information of the second mobility management network element to the network exposure function (NEF+SCEF) network element when the UE moves from the first (EPS) network to the second (5G) network, where the first mobility management network element serves the user equipment in the first network, and the second mobility management network element serves the user equipment in the second network.

According to the method in this embodiment of the present disclosure, in the scenario shown in FIG. 1, when the AMF network element does not support interworking with the MME network element through the N26 interface, after the user equipment moves from the EPS network to the 5G network, the NEF+SCEF network element sends the second information of the monitoring event to the AMF network element based on the obtained identification information of the AMF network element, to subscribe, in the 5G network, to a monitoring event that is the same as that in the EPS network, thereby ensuring that monitoring, in the network, on the monitoring event before the movement is not interrupted.

Figure 9:
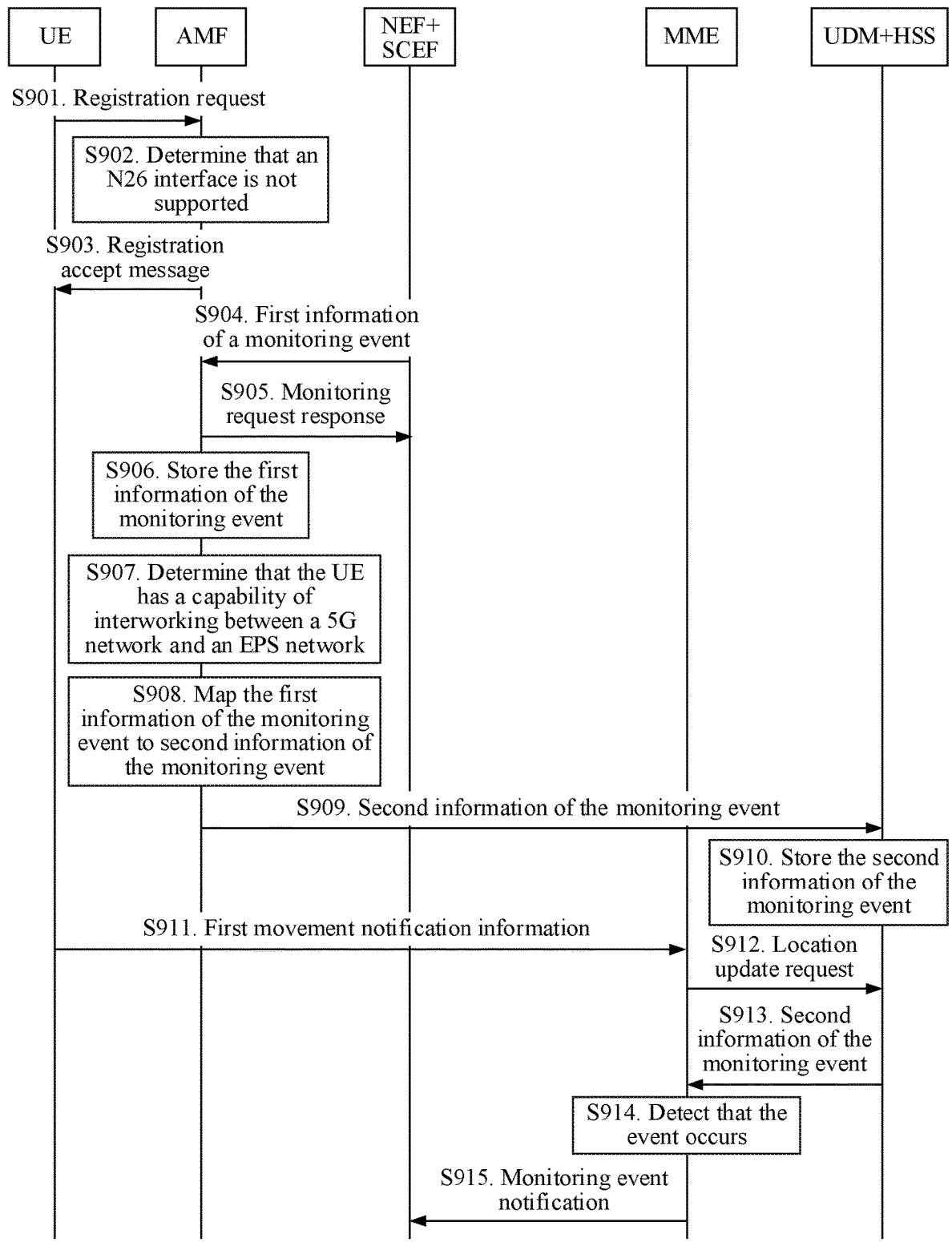
FIG. 9 is a flowchart of another monitoring event management method according to an embodiment of this application.

FIG. 9 is a flowchart of another monitoring event management method according to an embodiment of this application. The method shown in FIG. 9 is used to describe a scenario in which an AMF network element does not support interworking with an MME network element through an N26 interface, when a NEF+SCEF network element sends first information of a monitoring event to the AMF network element, the AMF network element determines that the AMF network element does not support an N26 interface, then, maps the first information of the monitoring event in a 5G network to second information of the monitoring event in an EPS network, and stores the second information in an HSS+UDM network element. When the UE moves from the 5G network to the EPS network, the HSS+UDM network element sends the second information of the monitoring event in the EPS network to the MME network element. FIG. 9 is described with reference to FIG. 1, FIG. 2, and FIG. 3. As shown in FIG. 9, the method may include the following steps.

For steps S901 to S907, refer to the descriptions of steps S301 to S307 in FIG. 3. Details are not described herein again.

It should be noted that S906 and S907 are optional steps, and an execution sequence of S906 and S907 is not limited in the present disclosure.

S908. The AMF network element maps the first information of the monitoring event to the second information of the monitoring event.

For example, the AMF network element maps the first information of the monitoring event in the 5G network to the second information of the monitoring event in the EPS network. For a parameter included in the first information of the monitoring event, refer to the description of Table 3 in the second possible manner in FIG. 2. For a parameter included in the second information of the monitoring event, refer to the description of Table 2 in the first possible manner in FIG. 2. Details are not described herein again.

For example, the mapping the first information of the monitoring event in the 5G network to the second information of the monitoring event in the EPS network may be implemented in the following manner.

(1) Map a subscription permanent identifier (SUPI) of the 5G network in the first information of the monitoring event to an international mobile subscriber identity (IMSI) of the EPS network in the second information of the monitoring event.

(2) Map identification information of a subscription network element NEF of the 5G network in the first information of the monitoring event to identification information of an SCEF network element of the EPS network in the second information of the monitoring event.

(3) Map Event ID and Event Filter(s) of the 5G network in the first information of the monitoring event to Monitoring Type of the EPS network in the second information of the monitoring event. For parameter descriptions of Event ID and Event Filter(s), refer to the description of Table 3. For a parameter description of Monitoring Type, refer to the description of Table 2. Details are not described herein again.

(4) Map Event Reporting Information of the 5G network in the first information of the monitoring event to Monitoring Duration and Maximum Number of Reports of the EPS network in the second information of the monitoring event. For a parameter description of Event Reporting Information, refer to the description of Table 3. For parameter descriptions of Monitoring Duration and Maximum Number of Reports, refer to the description of Table 2. Details are not described herein again.

S909. The AMF network element sends the second information of the monitoring event to the UDM+HSS network element. Correspondingly, the UDM+HSS network element receives the second information of the monitoring event from the AMF network element.

For example, the AMF network element invokes an Nudm_UECM_Update service of the UDM+HSS network element to send the second information of the monitoring event to the UDM+HSS network element. Optionally, the Nudm_UECM_Update service includes a permanent identifier of the UE and the second information of the monitoring event.

S910. The UDM+HSS network element stores the second information of the monitoring event.

For steps S911 and S912, refer to the descriptions of steps S309 and S310 in FIG. 3. Details are not described herein again.

S913. The UDM+HSS network element sends the second information of the monitoring event to the MME network element. Correspondingly, the MME network element receives the second information of the monitoring event from the UDM+HSS network element.

For example, after the MME network element of the EPS network receives an attach request message sent by the UE, the MME network element sends an update location request message to the UDM+HSS network element. The update location request message includes the permanent identifier of the UE and the identification information of the MME. The UDM+HSS network element sends the second information of the monitoring event to the MME network element using an update location response message based on the second information of the monitoring event that is obtained in S909.

For steps S914 and S915, refer to the descriptions of steps S315 and S316 in FIG. 3. Details are not described herein again.

With reference to the description of the foregoing embodiment, the present disclosure discloses the following monitoring event management method: The first mobility management (AMF) network element determines that the first mobility management network element does not support interworking with the second mobility management (MME) network element through an interface (an N26 interface). The first mobility management network element maps the first information of the monitoring event in the first (5G) network to the second information of the monitoring event in the second (EPS) network, where the first mobility management network element serves the UE in the first network, and the second mobility management network element serves the user equipment in the second network; and the first mobility management network element sends the second information of the monitoring event to the data management (UDM+HSS) network element.

According to the method in this embodiment of the present disclosure, in the scenario shown in FIG. 1, when the AMF network element does not support interworking with the MME network element through the N26 interface, the AMF network element maps the first information of the monitoring event in the 5G network to the second information of the monitoring event in the EPS network, and stores the second information in the HSS+UDM network element. After the UE moves from the 5G network to the EPS network, the HSS+UDM network element sends the second information of the monitoring event in the EPS network to the MME network element, to subscribe, in the EPS network, to a monitoring event that is the same as that in the 5G network, thereby ensuring that monitoring, in the network, on the monitoring event before the movement is not interrupted.

Figure 10:
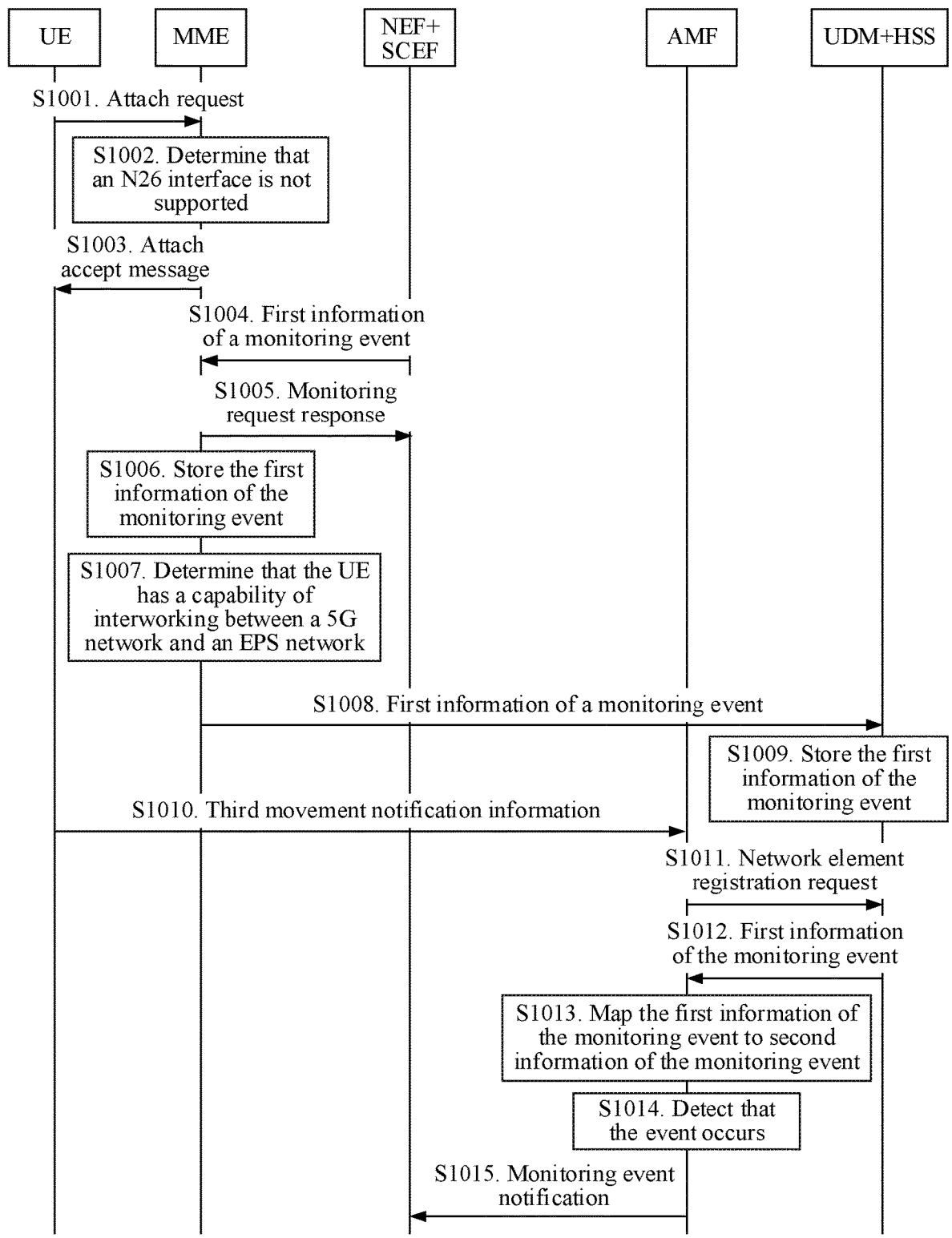
FIG. 10 is a flowchart of another monitoring event management method according to an embodiment of this application.

FIG. 10 is a flowchart of another monitoring event management method according to an embodiment of this application. The method shown in FIG. 10 is used to describe a scenario in which an AMF network element does not support interworking with an MME network element through an N26 interface, when a NEF+SCEF network element sends first information of a monitoring event to the MME network element, the MME network element determines that the AMF network element does not support the N26 interface, and then sends the first information of the monitoring event in an EPS network to an HSS+UDM network element. When UE moves from the EPS network to a 5G network, the HSS+UDM network element sends the first information of the monitoring event to the AMF network element, and the AMF network element maps the first information of the monitoring event in the EPS network to second information of the monitoring event in the 5G network. FIG. 10 is described with reference to FIG. 1, FIG. 2, FIG. 4, and FIG. 9. As shown in FIG. 10, the method may include the following steps.

For steps S1001 to S1007, refer to the descriptions of steps S401 to S407 in FIG. 4. Details are not described herein again.

It should be noted that S1006 and S1007 are optional steps, and an execution sequence of S1006 and S1007 is not limited in the present disclosure.

S1008. The MME network element sends the first information of the monitoring event to the HSS+UDM network element. Correspondingly, the HSS+UDM network element receives the first information of the monitoring event from the MME network element.

For example, the MME network element sends the first information of the monitoring event to the UDM+HSS network element using an update location request message.

S1009. The UDM+HSS network element stores the first information of the monitoring event.

For steps S1010 and S1011, refer to the descriptions of steps S409 and S410 in FIG. 4. Details are not described herein again.

S1012. The UDM+HSS network element sends the first information of the monitoring event to the AMF network element. Correspondingly, the AMF network element receives the first information of the monitoring event from the UDM+HSS network element.

For example, the UE initiates a registration procedure in the 5G network, adds a registration request message, and indicates that the UE moves from the EPS network to the 5G network. The AMF network element in the 5G network invokes an Nudm_UECM_Registration service of the UDM+HSS network element. The Nudm_UECM_Registration service includes a permanent identifier of the UE and identification information of the AMF network element. The UDM+HSS network element invokes an Nudm_SDM_Notification service to send the first information of the monitoring event to the AMF network element.

S1013. The AMF network element maps the first information of the monitoring event to the second information of the monitoring event.

For example, the AMF network element maps the first information of the monitoring event in the EPS network to the second information of the monitoring event in the 5G network. For a parameter included in the first information of the monitoring event, refer to the description of Table 2 in the first possible manner in FIG. 2. For a parameter included in the second information of the monitoring event, refer to the description of Table 3 in the second possible manner in FIG. 2. Details are not described herein again. An Nudm_UECM_Update service includes a permanent identifier of the UE and a monitoring event mapping context (mapped Monitoring Event context). The monitoring event mapping context is used to instruct to map the first information of the monitoring event in the EPS network to the second information of the monitoring event in the 5G network.

For example, the mapping the first information of the monitoring event in the EPS network to the second information of the monitoring event in the 5G network may be implemented in the following manner.

(1) Map an IMSI of the EPS network in the first information of the monitoring event to an SUPI of the 5G network in the second information of the monitoring event.

(2) Map identification information of an SCEF network element of the EPS network in the first information of the monitoring event to identification information of a subscription network element NEF of the 5G network in the second information of the monitoring event.

(3) Map Monitoring Type of the EPS network in the first information of the monitoring event to Event ID and Event Filter(s) of the 5G network in the second information of the monitoring event. For a parameter description of Monitoring Type, refer to the description of Table 2. For parameter descriptions of Event ID and Event Filter Information, refer to the description of Table 3. Details are not described herein again.

(4) Map Monitoring Duration and Maximum Number of Reports of the EPS network in the first information of the monitoring event to Event Reporting Information of the 5G network in the second information of the monitoring event. For parameter descriptions of Monitoring Duration and Maximum Number of Reports, refer to the description of Table 2. For a parameter description of Event Reporting Information, refer to the description of Table 3. Details are not described herein again.

For steps S1014 and S1015, refer to the descriptions of steps S415 and S416 in FIG. 4. Details are not described herein again.

With reference to the description of the foregoing embodiment, the present disclosure discloses the following monitoring event management method: The first mobility management (MME) network element determines that the first mobility management network element does not support interworking with the second mobility management (AMF) network element through an interface (an N26 interface). The first mobility management network element sends the first information of the monitoring event in the first (EPS) network to the second mobility management network element, and the second mobility management network element maps the first information of the monitoring event in the first network to the second information of the monitoring event in the second (5G) network. The first mobility management network element serves the UE in the first network, and the second mobility management network element serves the user equipment in the second network; and the first mobility management network element sends the second information of the monitoring event to the data management (UDM+HSS) network element.

According to the method in this embodiment of the present disclosure, in the scenario shown in FIG. 1, when the AMF network element does not support interworking with the MME network element through the N26 interface, the MME network element sends the first information of the monitoring event in the EPS network to the HSS+UDM network element. When the UE moves from the EPS network to the 5G network, the HSS+UDM network element sends the first information of the monitoring event to the AMF network element, and the AMF network element maps the first information of the monitoring event in the EPS network to the second information of the monitoring event in the 5G network, to subscribe, in the 5G network, to a monitoring event that is the same as that in the EPS network, thereby ensuring that monitoring, in the network, on the monitoring event before the movement is not interrupted.

It should be noted that, in the foregoing embodiment of this application, that the first mobility management network element supports interworking between the first network and the second network without an interface may be understood as that the first mobility management network element does not support interworking with the second mobility management network element through an interface, or may be understood as that the second mobility management network element does not support interworking with the first mobility management network element through an interface.

Figure 11:
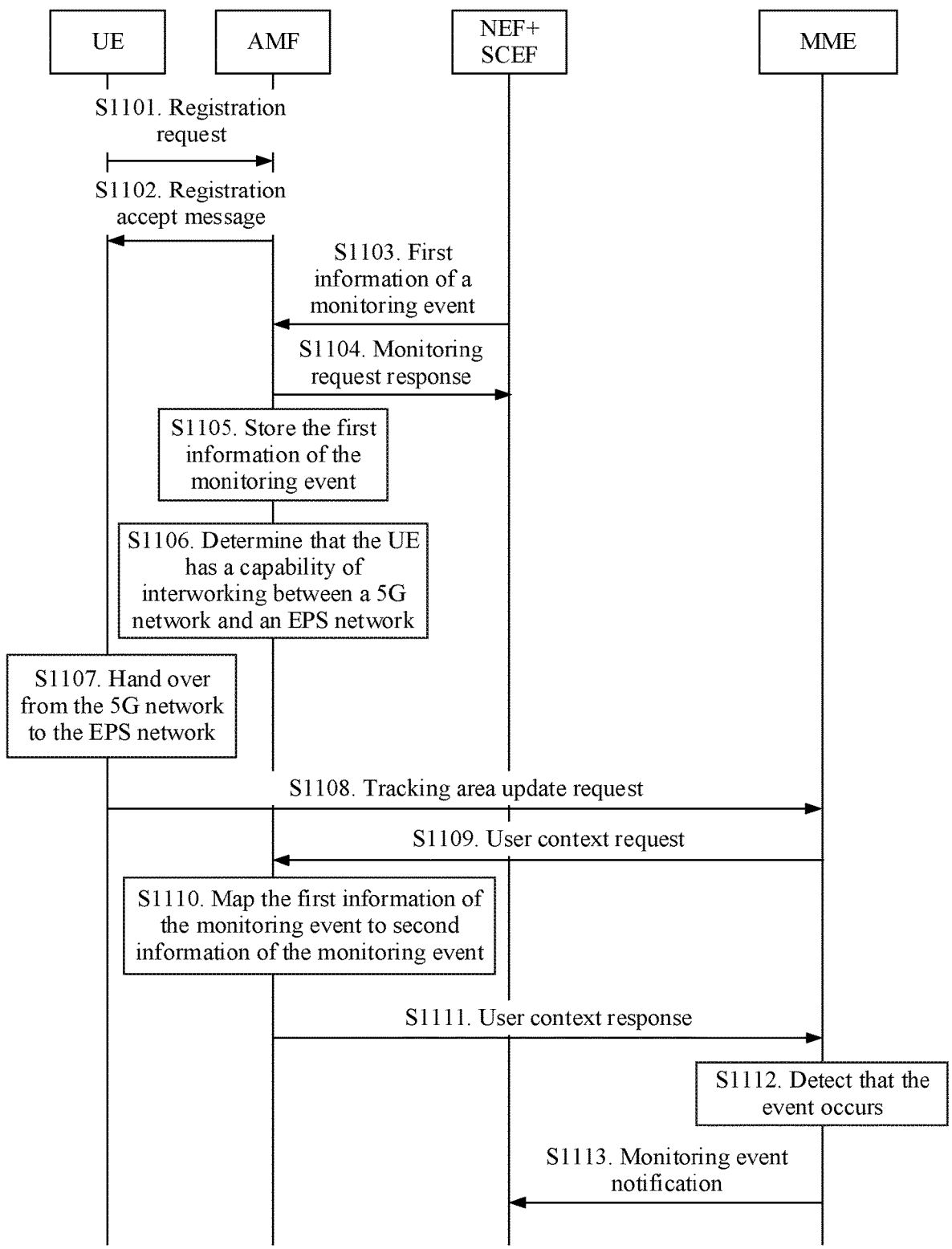
FIG. 11 is a flowchart of another monitoring event management method according to an embodiment of this application.

FIG. 11 is a flowchart of another monitoring event management method according to an embodiment of this application. The method shown in FIG. 11 is used to describe a scenario in which an AMF network element supports interworking with an MME network element through an N26 interface, the MME network element supports interworking with the AMF network element through the N26 interface, and UE is in an idle state, after a NEF+SCEF network element sends first information of a monitoring event to the AMF network element, when the UE moves from a 5G network to an EPS network, the AMF network element maps the first information of the monitoring event in the 5G network to second information of the monitoring event in the EPS network, and then sends the second information of the monitoring event in the EPS network to the MME network element through the N26 interface. FIG. 11 is described with reference to FIG. 9. As shown in FIG. 11, the method may include the following steps.

S1101. The UE sends a registration request to the AMF network element. Correspondingly, the AMF network element receives the registration request from the UE.

S1102. The AMF network element sends a registration accept message to the UE. Correspondingly, the UE receives the registration accept message from the AMF network element.

For example, the registration accept message includes indication information indicating that the AMF network element supports the N26 interface.

S1103. The NEF+SCEF network element sends the first information of the monitoring event to the AMF network element. Correspondingly, the AMF network element receives the first information of the monitoring event from the NEF+SCEF network element.

For example, for S1103, refer to the description of step S904 in FIG. 9. Details are not described herein again.

S1104. The AMF network element sends a monitoring request response to the NEF+SCEF network element. Correspondingly, the NEF+SCEF network element receives the monitoring request response from the AMF network element.

For example, the AMF network element sends the monitoring request response to the NEF+SCEF network element using an Namf_EventExposure_Subscribe response service.

S1105. The AMF network element stores the first information of the monitoring event.

S1106. The AMF network element determines that the UE has a capability of interworking between the 5G network and the EPS network.

For example, the AMF network element determines, based on subscription data of the UE, whether the UE has the capability of interworking between the 5G network and the EPS network.

It should be noted that S1105 and S1106 are optional steps, and an execution sequence of S1105 and S1106 is not limited in the present disclosure.

S1107. The UE is handed over from the 5G network to the EPS network.

For example, in a movement scenario in which the UE is in the idle state, the UE performs a tracking area update process in the EPS network to implement the handover from the 5G network to the EPS network.

S1108. The UE sends a tracking area update request to the MME network element. Correspondingly, the MME network element receives the tracking area update request from the UE.

For example, the UE sends the tracking area update request to the MME network element, to implement the handover from the 5G network to the EPS network.

S1109. The MME network element sends a user context request to the AMF network element. Correspondingly, the AMF network element receives the user context request from the MME network element.

For example, the MME network element sends the user context request to the AMF network element, to obtain context information of the UE.

S1110. The AMF network element maps the first information of the monitoring event to the second information of the monitoring event.

For example, for S1110, refer to the description of mapping, by the AMF network element, the first information of the monitoring event in the 5G network to the second information of the monitoring event in the EPS network in S908 in FIG. 9. Details are not described herein again.

It should be noted that S1110 may be performed between S1106 and S1109, or may be performed after S1109. This is not limited in the present disclosure.

S1111. The AMF network element sends a user context response to the MME network element. Correspondingly, the MME network element receives the user context response from the AMF network element. The user context response includes the second information of the monitoring event in S1110.

For steps S1112 and S1113, refer to the descriptions of steps S912 and S913 in FIG. 9. Details are not described herein again.

According to the method in this embodiment of the present disclosure, in the scenario shown in FIG. 1, in the scenario in which the AMF network element supports interworking with the MME network element through the N26 interface, and the UE is in the idle state, when the UE moves from the 5G network to the EPS network, the AMF network element sends the second information of the monitoring event in the EPS network to the MME network element through the N26 interface, to subscribe, in the EPS network, to a monitoring event that is the same as that in the 5G network, thereby ensuring that monitoring, in the network, on the monitoring event before the movement is not interrupted.

Figure 12:
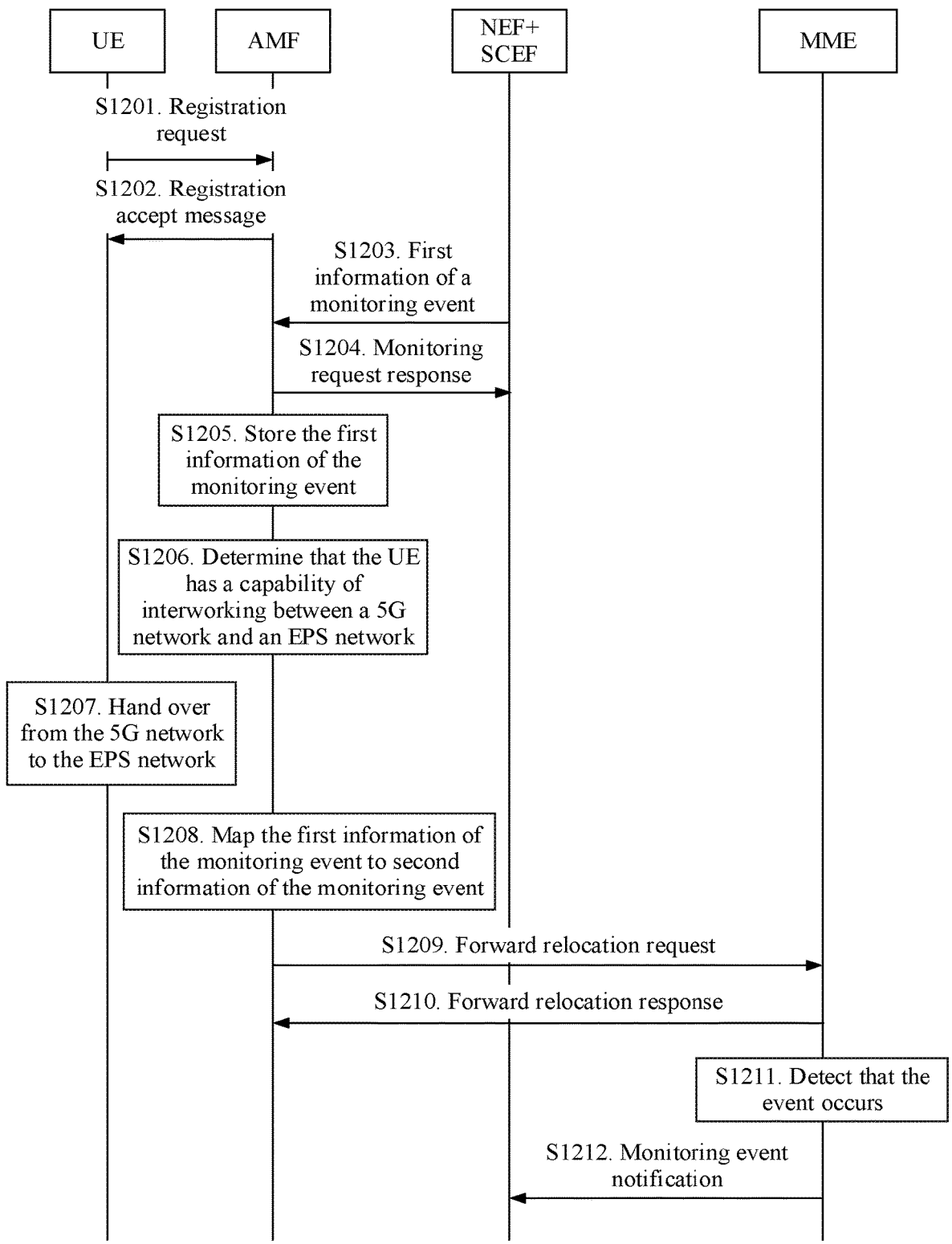
FIG. 12 is a flowchart of another monitoring event management method according to an embodiment of this application.

FIG. 12 is a flowchart of another monitoring event management method according to an embodiment of this application. The method shown in FIG. 12 is used to describe a scenario in which an AMF network element supports interworking with an MME network element through an N26 interface, the MME network element supports interworking with the AMF network element through the N26 interface, and UE is in a connected state, after a NEF+SCEF network element sends first information of a monitoring event to the AMF network element, when the UE moves from a 5G network to an EPS network, the AMF network element maps the first information of the monitoring event in the 5G network to second information of the monitoring event in the EPS network, and then sends the second information of the monitoring event in the EPS network to the MME network element through the N26 interface. FIG. 12 is described with reference to FIG. 11. As shown in FIG. 12, the method may include the following steps.

For steps S1201 to S1206, refer to the descriptions of steps S1101 to S1106 in FIG. 11. Details are not described herein again.

It should be noted that S1205 and S1206 are optional steps, and an execution sequence of S1205 and S1206 is not limited in the present disclosure.

S1207. The UE is handed over from the 5G network to the EPS network.

For example, when the UE is in a single-registration mode and in the connected state, the UE initiates a handover procedure in the EPS network to implement the handover from the 5G network to the EPS network.

S1208. The AMF network element maps the first information of the monitoring event to the second information of the monitoring event.

For example, for S1208, refer to the description of S1110 in FIG. 11. Details are not described herein again.

S1209. The AMF network element sends a forward relocation request to the MME network element. Correspondingly, the MME network element receives the forward relocation request from the AMF network element.

Optionally, the forward relocation request includes the second information of the monitoring event in S1208.

S1210. The MME network element sends a forward relocation response to the AMF network element. Correspondingly, the AMF network element receives the forward relocation response from the MME network element. Therefore, the MME network element obtains the second information of the monitoring event.

For steps S1211 and S1212, refer to the descriptions of steps S1112 and S1113 in FIG. 11. Details are not described herein again.

According to the method in this embodiment of the present disclosure, in the scenario shown in FIG. 1, in the scenario in which the AMF network element supports interworking with the MME network element through the N26 interface, and the UE is in the connected state, when the UE moves from the 5G network to the EPS network, the AMF network element sends the second information of the monitoring event in the EPS network to the MME network element through the N26 interface, to subscribe, in the EPS network, to a monitoring event that is the same as that in the 5G network, thereby ensuring that monitoring, in the network, on the monitoring event before the movement is not interrupted.

Figure 13:
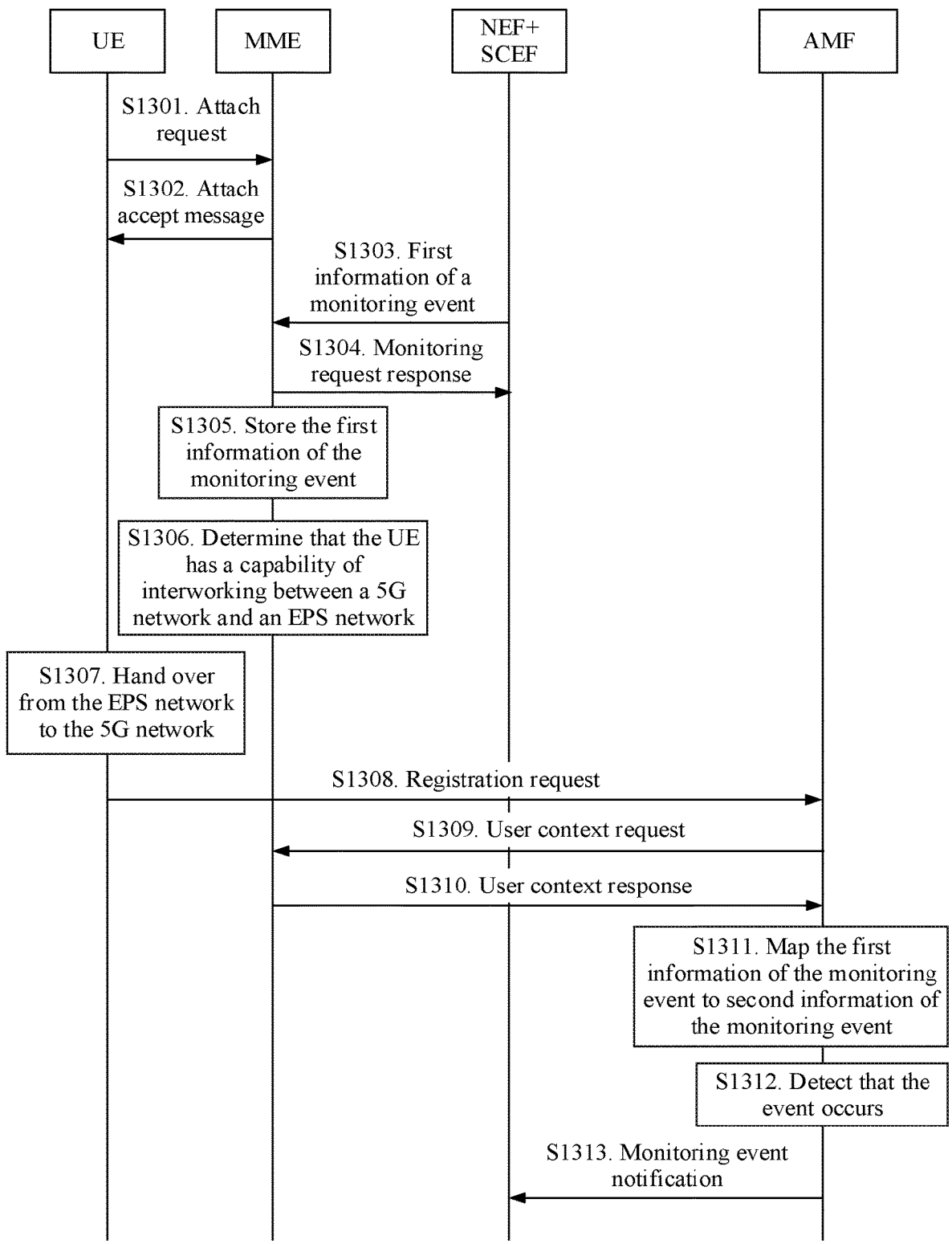
FIG. 13 is a flowchart of another monitoring event management method according to an embodiment of this application.

FIG. 13 is a flowchart of another monitoring event management method according to an embodiment of this application. The method shown in FIG. 13 is used to describe a scenario in which an AMF network element supports interworking with an MME network element through an N26 interface, the MME network element supports interworking with the AMF network element through the N26 interface, and UE is in an idle state, after a NEF+SCEF network element sends first information of a monitoring event to the MME network element, when the UE moves from an EPS network to a 5G network, the MME network element sends the first information of the monitoring event in the EPS network to the AMF network element through the N26 interface, and the AMF network element maps the first information of the monitoring event in the EPS network to second information of the monitoring event in the 5G network. FIG. 13 is described with reference to FIG. 10. As shown in FIG. 13, the method may include the following steps.

S1301. The UE sends an attach request to the MME network element. Correspondingly, the MME network element receives the attach request from the UE.

S1302. The MME network element sends an attach accept message to the UE. Correspondingly, the UE receives the attach accept message from the MME network element.

For example, the attach accept message includes indication information indicating that the MME network element supports the N26 interface.

S1303. The NEF+SCEF network element sends the first information of the monitoring event to the MME network element. Correspondingly, the MME network element receives the first information of the monitoring event from the NEF+SCEF network element.

For example, the NEF+SCEF network element sends the first information of the monitoring event to the MME network element using a monitoring request message. For the monitoring event, refer to the description of step S304 in FIG. 3. For a parameter included in the first information of the monitoring event, refer to the description of Table 2 in the first possible manner in FIG. 2. Details are not described herein again.

S1304. The MME network element sends a monitoring request response to the NEF+SCEF network element. Correspondingly, the NEF+SCEF network element receives the monitoring request response from the MME network element.

For example, the MME network element sends the monitoring request response to the NEF+SCEF network element using a monitoring response message.

S1305. The MME network element stores the first information of the monitoring event.

S1306. The MME network element determines that the UE has a capability of interworking between the 5G network and the EPS network.

It should be noted that S1305 and S1306 are optional steps, and an execution sequence of S1305 and S1306 is not limited in the present disclosure.

S1307. The UE is handed over from the EPS network to the 5G network.

For example, when the UE in a single-registration mode and in the idle state, the UE implements the handover from the EPS network to the 5G network using a registration procedure.

S1308. The UE sends a registration request to the AMF network element. Correspondingly, the AMF network element receives the registration request from the UE.

For example, the UE sends the registration request to the AMF network element, to implement the handover from the EPS network to the 5G network.

S1309. The AMF network element sends a user context request to the MME network element. Correspondingly, the MME network element receives the user context request from the AMF network element.

For example, the AMF network element sends the user context request to the MME network element, to obtain context information of the UE.

S1310. The MME network element sends a user context response to the AMF network element. Correspondingly, the AMF network element receives the user context response from the MME network element. The user context response includes the first information of the monitoring event in the EPS network.

S1311. The AMF network element maps the first information of the monitoring event to the second information of the monitoring event.

For example, for S1310, refer to the description of mapping, by the AMF network element, the first information of the monitoring event in the EPS network to the second information of the monitoring event in the 5G network in S1008 in FIG. 10. Details are not described herein again.

For steps S1312 and S1313, refer to the descriptions of steps S1014 and S1015 in FIG. 10. Details are not described herein again.

According to the method in this embodiment of the present disclosure, in the scenario shown in FIG. 1, in the scenario in which the AMF network element supports interworking with the MME network element through the N26 interface, and the UE is in the idle state, after the NEF+SCEF network element sends the first information of the monitoring event to the MME network element, when the UE moves from the EPS network to the 5G network, the MME network element sends the first information of the monitoring event in the EPS network to the AMF network element through the N26 interface, and the AMF network element maps the first information of the monitoring event in the EPS network to the second information of the monitoring event in the 5G network, to subscribe, in the 5G network, to a monitoring event that is the same as that in the EPS network, thereby ensuring that monitoring, in the network, on the monitoring event before the movement is not interrupted.

Figure 14:
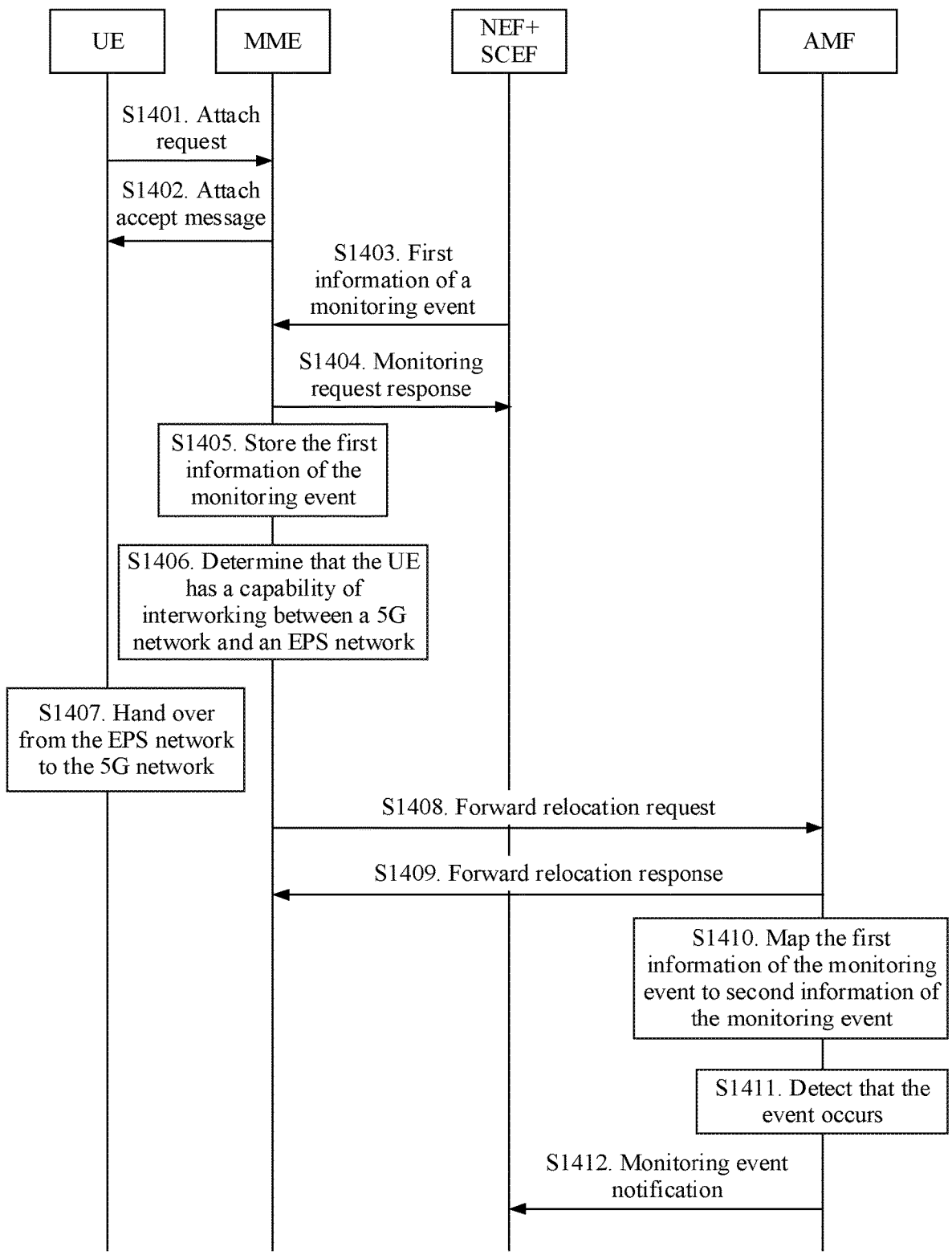
FIG. 14 is a flowchart of another monitoring event management method according to an embodiment of this application.

FIG. 14 is a flowchart of another monitoring event management method according to an embodiment of this application. The method shown in FIG. 14 is used to describe a scenario in which an AMF network element supports interworking with an MME network element through an N26 interface, the MME network element supports interworking with the AMF network element through the N26 interface, and UE is in a connected state, after a NEF+SCEF network element sends first information of a monitoring event to the AMF network element, when the UE moves from an EPS network to a 5G network, the MME network element sends the first information of the monitoring event in the EPS network to the AMF network element through the N26 interface, and the AMF network element maps the first information of the monitoring event in the EPS network to second information of the monitoring event in the 5G network. FIG. 14 is described with reference to FIG. 13. As shown in FIG. 14, the method may include the following steps.

For steps S1401 to S1406, refer to the descriptions of steps S1301 to S1306 in FIG. 13. Details are not described herein again.

It should be noted that S1405 and S1406 are optional steps, and an execution sequence of S1405 and S1406 is not limited in the present disclosure.

S1407. The UE is handed over from the EPS network to the 5G network.

For example, the UE that is in the connected state initiates a handover procedure in the 5G network to implement the handover from the EPS network to the 5G network.

S1408. The MME network element sends a forward relocation request to the AMF network element. Correspondingly, the AMF network element receives the forward relocation request from the MME network element. The forward relocation request includes the first information of the monitoring event in the EPS network.

S1409. The AMF network element sends a forward relocation response to the MME network element. Correspondingly, the MME network element receives the forward relocation response from the AMF network element.

S1410. The AMF network element maps the first information of the monitoring event to the second information of the monitoring event.

For example, for S1410, refer to the description of S1311 in FIG. 13. Details are not described herein again.

For steps S1411 and S1412, refer to the descriptions of steps S1312 and S1313 in FIG. 13. Details are not described herein again.

According to the method in this embodiment of the present disclosure, in the scenario shown in FIG. 1, in the scenario in which the AMF network element supports interworking with the MME network element through the N26 interface, and the UE is in the connected state, after the NEF+SCEF network element sends the first information of the monitoring event to the MME network element, when the UE moves from the EPS network to the 5G network, the MME network element sends the first information of the monitoring event in the EPS network to the AMF network element through the N26 interface, and the AMF network element maps the first information of the monitoring event in the EPS network to the second information of the monitoring event in the 5G network, to subscribe, in the 5G network, to a monitoring event that is the same as that in the EPS network, thereby ensuring that monitoring, in the network, on the monitoring event before the movement is not interrupted.

It should be noted that, in the foregoing embodiment of this application, that the first mobility management network element supports interworking with the second mobility management network element through the interface may be understood as that the second mobility management network element supports interworking with the first mobility management network element through the interface, or may be understood as that the first mobility management network element supports interworking between the first network and the second network through the interface.

In the foregoing embodiments provided in this application, the solutions of the communication method provided in the embodiments of this application are separately described from a perspective of each network element and from a perspective of interaction between the network elements. It may be understood that to perform the foregoing functions, each network element and device, for example, the radio access network device, the access and mobility management function network element, the user equipment, the data management function network element, and the network slice selection function network element, includes corresponding hardware structures and/or software modules for performing the functions. A person skilled in the art should be easily aware that, in combination with the examples described in the embodiments disclosed in this specification, units, and algorithms steps may be implemented by hardware or a combination of hardware and computer software in this application. Whether a function is performed by hardware or computer software driving hardware depends on particular applications and design constraints of the technical solutions. A person skilled in the art may use different methods to implement the described functions for each particular application, but it should not be considered that the implementation goes beyond the scope of this application.

Figure 15A:
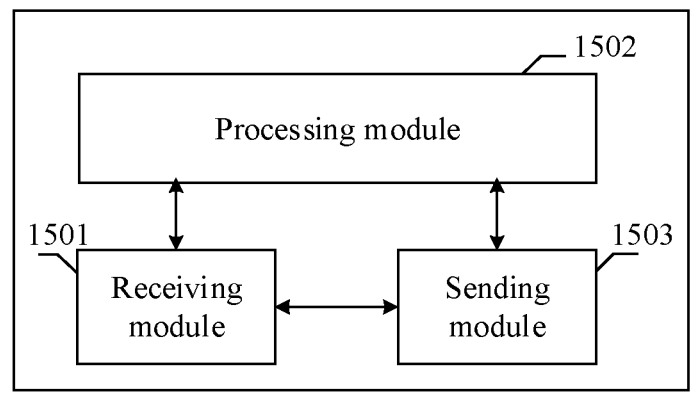
FIG. 15A and FIG. 15B are each a schematic structural diagram of a monitoring event management apparatus according to an embodiment of this application.

For example, when the foregoing network elements implement the corresponding functions using the software modules, a monitoring event management apparatus may include a receiving module 1501 and a sending module 1503, as shown in FIG. 15A.

In an embodiment, the apparatus for managing a monitoring event may be configured to execute an operation of the network exposure function network element (for example, the SCEF+NEF network element) in FIG. 2 to FIG. 8.

For example, the sending module 1503 is configured to send first information of a monitoring event to a first mobility management network element. The receiving module 1501 is configured to receive identification information of a second mobility management network element from a data management network element, where the second mobility management network element does not support interworking with the first mobility management network element through an interface, the first mobility management network element serves user equipment in a first network, and the second mobility management network element serves the user equipment in a second network. The sending module 1503 is configured to send second information of the monitoring event to the second mobility management network element based on the identification information of the second mobility management network element.

In this way, in this embodiment of the present disclosure, when the second mobility management network element does not support interworking with the first mobility management network element through an interface, in the first network, the network exposure function network element may subscribe to the monitoring event by sending the first information of the monitoring event to the first mobility management network element. After the user equipment moves from the first network to the second network, the network exposure function network element sends the second information of the monitoring event to the second mobility management network element based on the obtained identification information of the second mobility management network element, to subscribe to a same monitoring event in the second network, thereby ensuring that monitoring, in the network, on the monitoring event before the movement is not interrupted.

Optionally, after the receiving module 1501 receives first indication information from the first mobility management network element, the sending module 1503 is configured to send query information to the data management network element, where the query information is used by the monitoring event management apparatus to obtain the identification information of the second mobility management network element from the data management network element.

Optionally, the first indication information is used to indicate that the user equipment moves from the first network to the second network.

Optionally, the sending module 1503 is configured to subscribe from the data management network element to: sending, by the data management network element, the identification information of the second mobility management network element to the monitoring event management apparatus when the user equipment moves from the first network to the second network.

Optionally, before the sending module 1503 subscribes from the data management network element, the receiving module 1501 is further configured to receive second indication information from the first mobility management network element, where the second indication information is used to indicate that the first mobility management network element does not support interworking with the second mobility management network element through an interface.

In addition, the receiving module 1501 and the sending module 1503 in the monitoring event management apparatus may further implement other operations or functions of the network exposure function network element in the foregoing methods. Details are not described herein again.

In another embodiment, the monitoring event management apparatus shown in FIG. 15A may alternatively be configured to perform operations of the first mobility management network element (for example, the AMF network element or the MME network element) in FIG. 3 and FIG. 4.

For example, the sending module 1503 is configured to subscribe from a data management network element to: notifying, by the data management network element, the monitoring event management apparatus when user equipment moves from a first network to a second network, where the monitoring event management apparatus serves the user equipment in the first network. The receiving module 1501 is configured to receive a notification from the data management network element, to learn that the user equipment moves from the first network to the second network. The sending module 1503 is configured to send indication information to a network exposure function network element, where the indication information is used to trigger the network exposure function network element to query the data management network element for identification information of a mobility management network element. The mobility management network element serves the user equipment in the second network, and the monitoring event management apparatus does not support interworking with the mobility management network element through an interface.

In this way, in this embodiment of the present disclosure, when the second mobility management network element does not support interworking with the first mobility management network element through an interface, in the first network, the network exposure function network element may subscribe to a monitoring event by sending first information of the monitoring event to the first mobility management network element. The first mobility management network element subscribes from the data management network element to an event that the user equipment moves from the first network to the second network. When the first mobility management network element learns, from the data management network element, that the user equipment moves from the first network to the second network, the first mobility management network element triggers the network exposure function network element to obtain the identification information of the second mobility management network element from the data management network element. Then, the network exposure function network element sends second information of the monitoring event to the second mobility management network element. In this way, the network exposure function network element subscribes, in the second network, to a monitoring event that is the same as that in the first network, thereby ensuring that monitoring, in the network, on the monitoring event before the movement is not interrupted.

Optionally, the indication information is further used to indicate that the user equipment moves from the first network to the second network.

In addition, the receiving module 1501 and the sending module 1503 in the monitoring event management apparatus may further implement other operations or functions of the first mobility management network element in the foregoing methods. Details are not described herein again.

In another embodiment, the monitoring event management apparatus shown in FIG. 15A may alternatively be configured to perform operations of the first mobility management network element (for example, the AMF network element or the MME network element) in FIG. 5 and FIG. 6.

For example, a processing module 1502 is configured to determine that the monitoring event management apparatus does not support interworking with a mobility management network element through an interface, where the monitoring event management apparatus serves user equipment in a first network, and the mobility management network element serves the user equipment in a second network. The sending module 1503 is configured to send indication information to a network exposure function network element, where the indication information is used to indicate that the monitoring event management apparatus does not support interworking with the mobility management network element through an interface.

In this way, when the second mobility management network element does not support interworking with the first mobility management network element through an interface, when the network exposure function network element sends first information of a monitoring event to the first mobility management network element, the first mobility management network element notifies the network exposure function network element that the first mobility management network element does not support interworking with the second mobility management network element through an interface, and triggers the network exposure function network element to subscribe to and obtain identification information of the second mobility management network element from the data management network element. When the user equipment moves from the first network to the second network, the data management network element sends the identification information of the second mobility management network element to the network exposure function network element, and then the network exposure function network element sends second information of the monitoring event to the second mobility management network element. In this way, the network exposure function network element subscribes, in the second network, to a monitoring event that is the same as that in the first network, thereby ensuring that monitoring, in the network, on the monitoring event before the movement is not interrupted.

In addition, the processing module 1502 and the sending module 1503 in the monitoring event management apparatus may further implement other operations or functions of the first mobility management network element in the foregoing methods. Details are not described herein again.

In another embodiment, the monitoring event management apparatus shown in FIG. 15A may alternatively be configured to perform operations of the first mobility management network element (for example, the AMF network element or the MME network element) in FIG. 7 and FIG. 8.

For example, the processing module 1502 is configured to determine that the monitoring event management apparatus does not support interworking with a mobility management network element through an interface. The sending module 1503 is configured to subscribe from a data management network element to: sending, by the data management network element, identification information of the mobility management network element to a network exposure function network element when user equipment moves from a first network to a second network, where the monitoring event management apparatus serves the user equipment in the first network, and the mobility management network element serves the user equipment in the second network.

In this way, when the second mobility management network element does not support interworking with the first mobility management network element through an interface, when the network exposure function network element sends first information of a monitoring event to the first mobility management network element, the first mobility management network element determines that the first mobility management network element does not support interworking with the second mobility management network element through the interface, and subscribes from the data management network element, such that the network exposure function network element obtains the identification information of the second mobility management network element. When the user equipment moves from the first network to the second network, the data management network element sends the identification information of the second mobility management network element to the network exposure function network element, and then the network exposure function network element sends second information of the monitoring event to the second mobility management network element. In this way, the network exposure function network element subscribes, in the second network, to a monitoring event that is the same as that in the first network, thereby ensuring that monitoring, in the network, on the monitoring event before the movement is not interrupted.

Optionally, the sending module 1503 is configured to send a type of the mobility management network element and identification information of the network exposure function network element to the data management network element.

Optionally, the processing module 1502 is configured to determine, based on subscription data of the user equipment, that the user equipment has a capability of interworking between the first network and the second network.

In addition, the processing module 1502 and the sending module 1503 in the monitoring event management apparatus may further implement other operations or functions of the first mobility management network element in the foregoing methods. Details are not described herein again.

In another embodiment, the monitoring event management apparatus shown in FIG. 15A may alternatively be configured to perform operations of the first mobility management network element (for example, the AMF network element or the MME network element) in FIG. 9 and FIG. 10.

For example, a processing module 1502 is configured to determine that the monitoring event management apparatus does not support interworking with a mobility management network element through an interface. The processing module 1502 is configured to map first information of a monitoring event in a first network to second information of the monitoring event in a second network. The monitoring event management apparatus serves user equipment in the first network, and the mobility management network element serves the user equipment in the second network. The sending module 1503 is configured to send the second information of the monitoring event to a data management network element.

In this way, when the second mobility management network element does not support interworking with the first mobility management network element through an interface, when a network exposure function network element sends the first information of the monitoring event to the first mobility management network element, the first mobility management network element determines that the first mobility management network element does not support interworking with the second mobility management network element through an interface; and then, the first mobility management network element maps the first information of the monitoring event in the first network to the second information of the monitoring event in the second network, and sends the second information of the monitoring event to the data management network element. When the user equipment moves from the first network to the second network, the data management network element sends the second information of the monitoring event to the second mobility management network element. In this way, the network exposure function network element subscribes, in the second network, to a monitoring event that is the same as that in the first network, thereby ensuring that monitoring, in the network, on the monitoring event before the movement is not interrupted.

In addition, the processing module 1502 and the sending module 1503 in the monitoring event management apparatus may further implement other operations or functions of the first mobility management network element in the foregoing methods. Details are not described herein again.

Figure 15B:
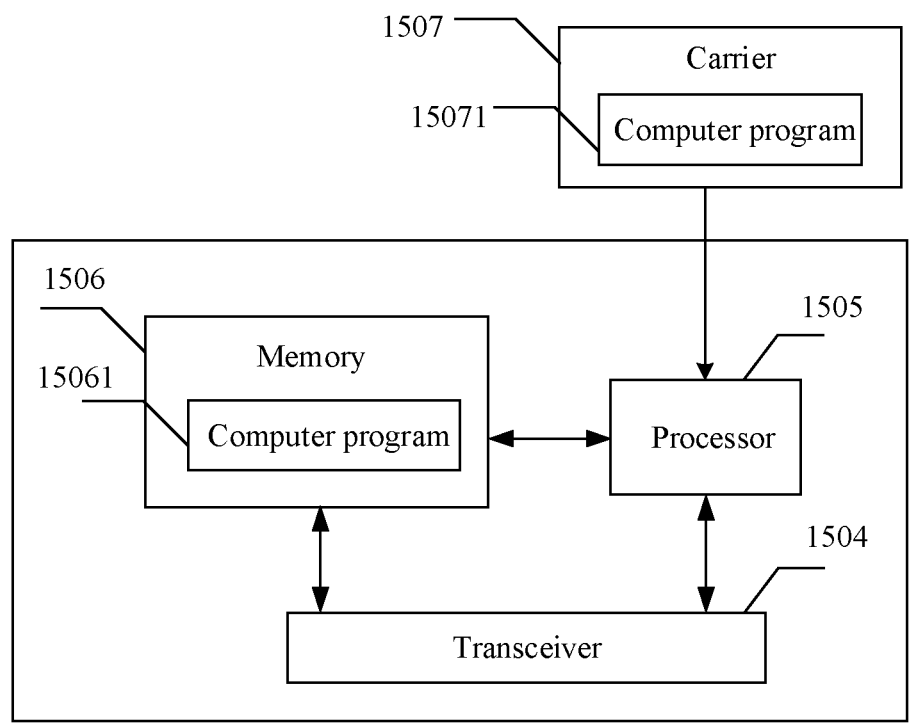

FIG. 15B is another possible schematic structural diagram of the monitoring event management apparatus in the foregoing embodiments. The monitoring event management apparatus may include a transceiver 1504 and a processor 1505, as shown in FIG. 15B. For example, the processor 1505 may be a general-purpose microprocessor, a data processing circuit, an application-specific integrated circuit (ASIC), or a field programmable gate array (FPGA) circuit. The monitoring event management apparatus may further include a memory 1506. For example, the memory is a random-access memory (RAM). The memory is configured to couple to the processor 1505, and stores a computer program 15061 necessary for the monitoring event management apparatus.

In addition, the monitoring event management method in the foregoing embodiments further provides a carrier 1507, where the carrier stores a computer program 15071 of the monitoring event management apparatus, and the computer program 15071 may be loaded to the processor 1505. The carrier may be an optical signal, an electrical signal, an electromagnetic signal, or a computer-readable storage medium (for example, a hard disk).

When the computer program 15061 or 15071 is run on a computer (for example, the processor 1505), the computer may be enabled to perform the foregoing method.

For example, in an embodiment, the processor 1505 is configured to perform another operation or function of the network exposure function network element. The transceiver 1504 is configured to implement communication between the network exposure function network element and a first mobility management network element/a data management network element/a second mobility management network element.

In another embodiment, the processor 1505 is configured to perform another operation or function of the first mobility management network element. The transceiver 1504 is configured to implement communication between the monitoring event management apparatus and a network exposure function network element/a data management network element.

In another embodiment, the processor 1505 is configured to perform another operation or function of the first mobility management network element. The transceiver 1504 is configured to implement communication between the monitoring event management apparatus and a network exposure function network element. In another embodiment, the processor 1505 is configured to perform another operation or function of the first mobility management network element. The transceiver 1504 is configured to implement communication between the monitoring event management apparatus and a data management network element.

The controller/processor configured to perform functions of the radio access network device in this application may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The controller/processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

Method or algorithm steps described in combination with the content disclosed in this application may be implemented by hardware, or may be implemented by a processor executing a software instruction. The software instruction may be formed by a corresponding software module. The software module may be located in a RAM memory, a flash memory, a read-only memory (ROM), an erasable programmable read-only memory (EPROM) memory, an electrically (EEPROM), a register, a hard disk, a removable magnetic disk, a compact disc (CD)-ROM (CD-ROM), or a storage medium of any other form known in the art. For example, a storage medium is coupled to a processor, such that the processor can read information from the storage medium or write information into the storage medium. Certainly, the storage medium may be a component of the processor. The processor and the storage medium may be located in the ASIC. In addition, the ASIC may be located in the radio access network device. Certainly, the processor and the storage medium may alternatively exist in the radio access network device as discrete components.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive solid-state drive (SSD)), or the like.

The objectives, technical solutions, and benefits of the present disclosure are further described in detail in the foregoing embodiments. It should be understood that the foregoing descriptions are merely example embodiments of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A monitoring event management method, comprising:
   receiving, by a data management network element, a subscription from a first mobility management network element;
   sending, by the data management network element, according to the subscription, identification information of a second mobility management network element to a network exposure function network element when a user equipment moves from a first network to a second network, wherein the first mobility management network element serves the user equipment in the first network, and wherein the second mobility management network element serves the user equipment in the second network; and
   receiving, by the network exposure function network element, the identification information from the data management network element.

2. The monitoring event management method according to claim 1, wherein the first mobility management network element supports interworking between the first network and the second network without an interface.

3. The monitoring event management method according to claim 1, further comprising:
   sending, by the network exposure function network element, first information of a monitoring event to the first mobility management network element; and
   sending, by the network exposure function network element, second information of the monitoring event to the second mobility management network element based on the identification information.

4. The monitoring event management method according to claim 1, further comprising:
   determining, by the first mobility management network element, that the first mobility management network element supports interworking between the first network and the second network without an interface; and
   sending, by the first mobility management network element, the subscription to the data management network element.

5. The monitoring event management method according to claim 1, further comprising determining, by the first mobility management network element based on subscription data of the user equipment, that the user equipment is capabile of interworking between the first network and the second network.

6. The monitoring event management method according to claim 1, further comprising sending, by the first mobility management network element, indication information to the network exposure function network element, wherein the indication information indicates that the first mobility management network element supports interworking between the first network and the second network without an interface.

7. The monitoring event management method according to claim 1, wherein receiving the subscription comprises receiving, by the data management network element, a type of the second mobility management network element and second identification information of the network exposure function network element from the first mobility management network element.

8. A monitoring event management system, comprising:
a data management network element configured to receive a subscription from a first mobility management network element, and send identification information of a second mobility management network element when a user equipment moves from a first network to a second network according to the subscription, wherein the first mobility management network element serves the user equipment in the first network, and wherein the second mobility management network element serves the user equipment in the second network; and
a network exposure function network element configured to receive the identification information from the data management network element.

9. The monitoring event management system according to claim 8, wherein the first mobility management network element supports interworking between the first network and the second network without an interface.

10. The monitoring event management system according to claim 8, wherein the network exposure function network element is further configured to:
send first information of a monitoring event to the first mobility management network element; and
send second information of the monitoring event to the second mobility management network element based on the identification information.

11. The monitoring event management system according to claim 8, further comprising the first mobility management network element, wherein the first mobility management network element is configured to:
determine that the first mobility management network element supports interworking between the first network and the second network without an interface; and
send the subscription to the data management network element.

12. The monitoring event management system according to claim 8, wherein the first mobility management network element is further configured to determine that the user equipment is capable of interworking between the first network and the second network.

13. The monitoring event management system according to claim 8, wherein the first mobility management network element is further configured to send indication information to the network exposure function network element, wherein the indication information indicates that the first mobility management network element supports interworking between the first network and the second network without an interface.

14. The monitoring event management system according to claim 8, wherein the data management network element is configured to receive a type of the second mobility management network element and second identification information of the network exposure function network element from the first mobility management network element.

15. A monitoring event management method, comprising:
receiving, by a data management network element, a subscription from a first mobility management network element; and
sending, by the data management network element and according to the subscription, identification information of a second mobility management network element to a network exposure function network element when a user equipment moves from a first network to a second network,
wherein the first mobility management network element serves the user equipment in the first network, and
wherein the second mobility management network element serves the user equipment in the second network.

16. The monitoring event management method according to claim 15, wherein the first mobility management network element supports interworking between the first network and the second network without an interface.

17. The monitoring event management method according to claim 15, wherein receiving the subscription comprises receiving, by the data management network element, a type of the second mobility management network element and second identification information of the network exposure function network element from the first mobility management network element.

18. The monitoring event management method according to claim 15, wherein the user equipment is capable of interworking between the first network and the second network.

19. The monitoring event management method according to claim 15, wherein the first mobility management network element comprises an access and mobility management function (AMF).

20. The monitoring event management method according to claim 15, wherein the first mobility management network element comprises a mobility management entity (MME).

* * * * *